US010303617B2

United States Patent
Kim et al.

(10) Patent No.: US 10,303,617 B2
(45) Date of Patent: May 28, 2019

(54) STORAGE DEVICE SUPPORTING BYTE ACCESSIBLE INTERFACE AND BLOCK ACCESSIBLE INTERFACE AND ELECTRONIC SYSTEM INCLUDING THE SAME

(71) Applicants: Dong-Gun Kim, Hwaseong-si (KR);
Dae-Ho Kim, Hwaseong-si (KR);
Hong-Moon Wang, Suwon-si (KR);
Won-Moon Cheon, Hwaseong-si (KR)

(72) Inventors: Dong-Gun Kim, Hwaseong-si (KR);
Dae-Ho Kim, Hwaseong-si (KR);
Hong-Moon Wang, Suwon-si (KR);
Won-Moon Cheon, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/704,943

(22) Filed: Sep. 14, 2017

(65) Prior Publication Data
US 2018/0150404 A1  May 31, 2018

(30) Foreign Application Priority Data
Nov. 30, 2016  (KR) .................. 10-2016-0161470

(51) Int. Cl.
G06F 12/00  (2006.01)
G06F 12/1009  (2016.01)
G06F 13/00  (2006.01)
G06F 13/28  (2006.01)

(52) U.S. Cl.
CPC .... *G06F 12/1009* (2013.01); *G06F 2212/657* (2013.01)

(58) Field of Classification Search
CPC ................. G06F 12/1009; G06F 2212/657
See application file for complete search history.

(56) References Cited

U.S. PATENT DOCUMENTS

| 7,761,687 | B2 | 7/2010 | Blumrich et al. |
| 8,364,884 | B2 | 1/2013 | Nagadomi |
| 8,799,240 | B2 | 8/2014 | Stowe et al. |

(Continued)

FOREIGN PATENT DOCUMENTS

| JP | 2016062406 A | 4/2016 |
| KR | 1386013 B | 1/2014 |
| KR | 1531447 B | 6/2015 |

*Primary Examiner* — Mark A Giardino, Jr.
(74) *Attorney, Agent, or Firm* — Volentine, Whitt & Francos, PLLC

(57) ABSTRACT

An electronic system includes a host device and a storage device. The storage device includes a first memory device that is accessed by the host device by units of a byte through a byte accessible interface and a second memory device that is accessed by the host device by units of a block through a block accessible interface. The storage device performs an internal data transfer between the first memory device and the second memory device based on an internal transfer command that is provided through the block accessible interface from the host device. The electronic system may efficiently support the access by units of a byte and the access by units of a block between the host device and the storage device by performing internal data transfer in the storage device using the internal transfer command that is modified from the existing block access command.

18 Claims, 36 Drawing Sheets

(56) References Cited

U.S. PATENT DOCUMENTS

| | | | |
|---|---|---|---|
| 8,880,777 B2* | 11/2014 | Kim | G06F 12/0246 |
| | | | 711/103 |
| 8,880,829 B2 | 11/2014 | Reid et al. | |
| 8,892,844 B2 | 11/2014 | Walker | |
| 9,208,159 B2 | 12/2015 | Stowe et al. | |
| 9,886,194 B2* | 2/2018 | Zheng | G06F 3/0605 |
| 2004/0027857 A1* | 2/2004 | Ooishi | G11C 16/10 |
| | | | 365/185.11 |
| 2006/0198227 A1* | 9/2006 | Okada | G11C 5/141 |
| | | | 365/229 |
| 2009/0203430 A1* | 8/2009 | Peek | G07F 17/32 |
| | | | 463/25 |
| 2013/0275661 A1 | 10/2013 | Zimmer et al. | |
| 2017/0131943 A1* | 5/2017 | Le | G06F 3/0647 |
| 2018/0018171 A1* | 1/2018 | Amidi | G06F 3/061 |

\* cited by examiner

FIG. 3A

| BYTES | DESCRIPTION |
|---|---|
| 63:60 | CDW15 |
| 59:56 | CDW14 |
| 55:52 | CDW13 |
| 51:48 | CDW12 |
| 47:44 | CDW11 |
| 43:40 | CDW10 |
| 39:24 | PRP ENTRY |
| 23:16 | MPTR |
| 15:08 | RESERVED |
| 07:04 | NSID |
| 03:00 | CDW0 |

FIG. 3B

| BIT | DESCRIPTION |
|---|---|
| 31:16 | CID |
| 15:14 | PSDT |
| 13:10 | RESERVED |
| 09:08 | FUSE |
| 07:00 | OPC |

FIG. 3C

| OPCODE(07) | OPCODE(06:02) | OPCODE(01:00) | OPCODE | O/M | COMMAND |
|---|---|---|---|---|---|
| COMMAND TYPE | FUNCTION | DATA TRANSFER | | | |
| 0b | 000 00b | 00b | 00h | M | FL |
| 0b | 000 00b | 01b | 01h | M | WR |
| 0b | 000 00b | 10b | 02h | M | RD |
| 0b | 000 01b | 00b | 04h | O | WU |
| 0b | 000 01b | 01b | 05h | O | CP |
| 0b | 000 10b | 00b | 08h | O | WZ |
| 0b | 000 10b | 01b | 09h | O | DM |
| ... | ... | ... | ... | ... | RESERVED |
| 1b | 000 00b | 00b | 10h | O | LD |
| 1b | 000 00b | 01b | 11h | O | SWR |
| 1b | 000 01b | 00b | 14h | O | CB |
| 1b | 000 01b | 01b | 15h | O | LBU |
| 1b | 000 01b | 10b | 16h | O | LRS |
| 1b | 000 10b | 00b | 18h | O | BU |
| 1b | 000 11b | 00b | 1Ch | O | DR |

STCMD: rows with OPCODE(07)=0b
ITCMD: rows with OPCODE(07)=1b

STORAGE DEVICE SUPPORTING BYTE ACCESSIBLE INTERFACE AND BLOCK ACCESSIBLE INTERFACE AND ELECTRONIC SYSTEM INCLUDING THE SAME

CROSS-REFERENCE TO RELATED APPLICATION

A claim priority for under 35 USC § 119 is made to Korean Patent Application No. 10-2016-0161470, filed on Nov. 30, 2016, in the Korean Intellectual Property Office (KIPO), the disclosure of which is incorporated in its entirety by reference.

BACKGROUND

The inventive concepts described herein generally relate to semiconductor integrated circuits, and more particularly to a storage device supporting a byte accessible interface and a block accessible interface, an electronic system including a storage device, and a method of operating an electronic device.

Generally, embedded systems may for example use dynamic random access memory (DRAM) as main memory to run software, and NAND flash memory to store user data. DRAM provides comparably fast read and write speed and enables byte-access. However, because DRAM is volatile memory, power consumption may be substantially large due to the requirement of regular refreshing processes. Accordingly, DRAM is generally used to store software read/write (R/W) data. NAND flash memory typically supports input/output (I/O) processing in units of pages (e.g., 2 KB), and thus is generally not used to execute codes or store software R/W data. However, due to characteristics including fast R/W speed in transmitting mass data, inexpensive cost and high capacity, NAND flash memory is generally used to store user data. As such, because various memories are utilized in different ways and have different functionalities, designing a system including these various memories increases design complexity as well as manufacturing cost.

SUMMARY

Embodiments of the inventive concept provide a storage device capable of efficiently supporting a byte accessible interface and a block accessible interface, and an electronic system including the storage device.

Embodiments of the inventive concept provide a method of operating an electronic system including a storage device capable of efficiently supporting a byte accessible interface and a block accessible interface.

Embodiments of the inventive concept provide an electronic system including a host device and a storage device. The storage device includes a first memory device that is accessed by the host device by units of a byte through a byte accessible interface and a second memory device that is accessed by the host device by units of a block through a block accessible interface. The storage device is configured to perform an internal data transfer between the first memory device and the second memory device based on an internal transfer command that is provided through the block accessible interface from the host device.

Embodiments of the inventive concept further provide a storage device including a first memory device configured to be accessed by a host device through a byte accessible interface, a second memory device configured to be accessed by the host device through a block accessible interface, an internal transfer controller configured to perform an internal data transfer between the first memory device and the second memory device, and a storage controller configured to receive a block access command and an internal transfer command through the block accessible interface, to perform an access to the second memory device by units of a block based on the block access command, and to control the internal data transfer performed by the internal data transfer controller based on the internal transfer command.

Embodiments of the inventive concept still further provide a method of operating an electronic system including a host device and a storage device. The method includes accessing, by the host device, a first memory device included in the storage device by units of a byte through a byte accessible interface; accessing, by the host device, a second memory device included in the storage device by units of a block through a block accessible interface; and performing, by the storage device, an internal data transfer between the first memory device and the second memory device based on an internal transfer command provided from the host device to the storage device through the block accessible interface.

The storage device and the electronic system according to embodiments of the inventive concept may efficiently support the access by units of a byte and the access by units of a block between the host device and the storage device by performing internal data transfer in the storage device using the internal transfer command that is modified from the existing block access command. The access by units of byte may be supported efficiently through the internal data transfer in the storage device, and thus the inter-device data transfer between the host device and the storage device may be reduced and performance of the storage device and the electronic system may be enhanced.

BRIEF DESCRIPTION OF THE DRAWINGS

Example embodiments of the present disclosure will be more clearly understood from the following detailed description taken in conjunction with the accompanying drawings.

FIG. 3A illustrates a diagram of an example format of a command that is transferred through a block accessible interface in an electronic system.

FIG. 3B illustrates a diagram of an example format of a lowest double word included in the command of FIG. 3A.

FIG. 3C illustrates a diagram of an example operation code included in the lowest double word of FIG. 3B.

DETAILED DESCRIPTION OF THE EMBODIMENTS

Figure 1:
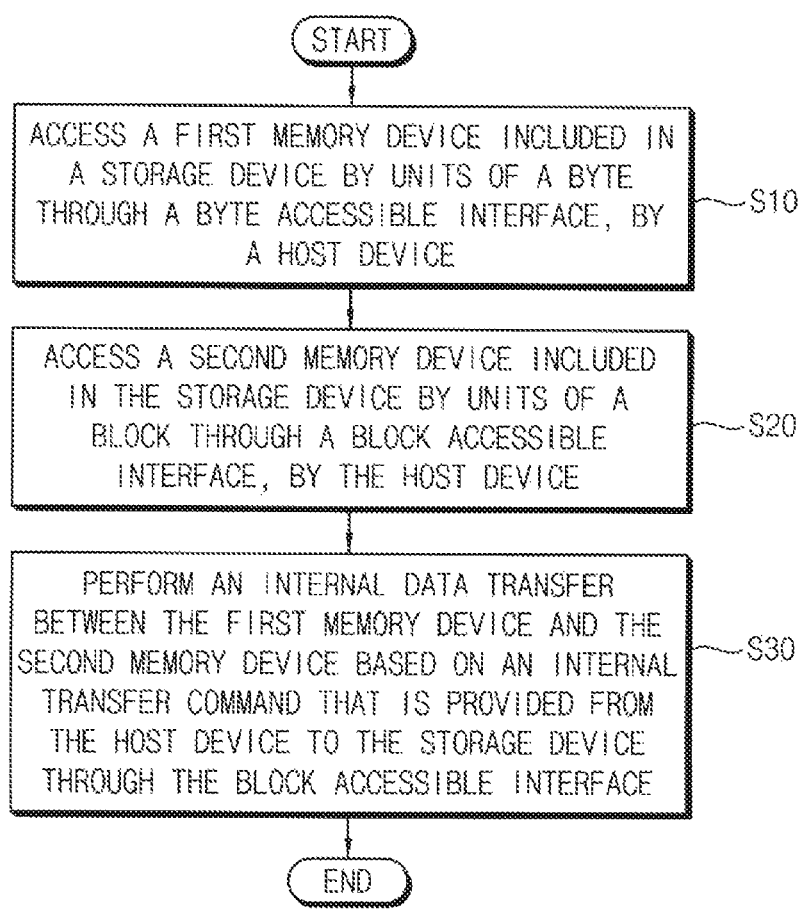
FIG. 1 illustrates a flow chart of a method of operating an electronic system according to embodiments of the inventive concept.

Various example embodiments will be described more fully hereinafter with reference to the accompanying drawings, in which some example embodiments are shown. In the drawings, like numerals refer to like elements throughout. Repeated descriptions of similar structure and function in the various embodiments may be omitted.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 2:
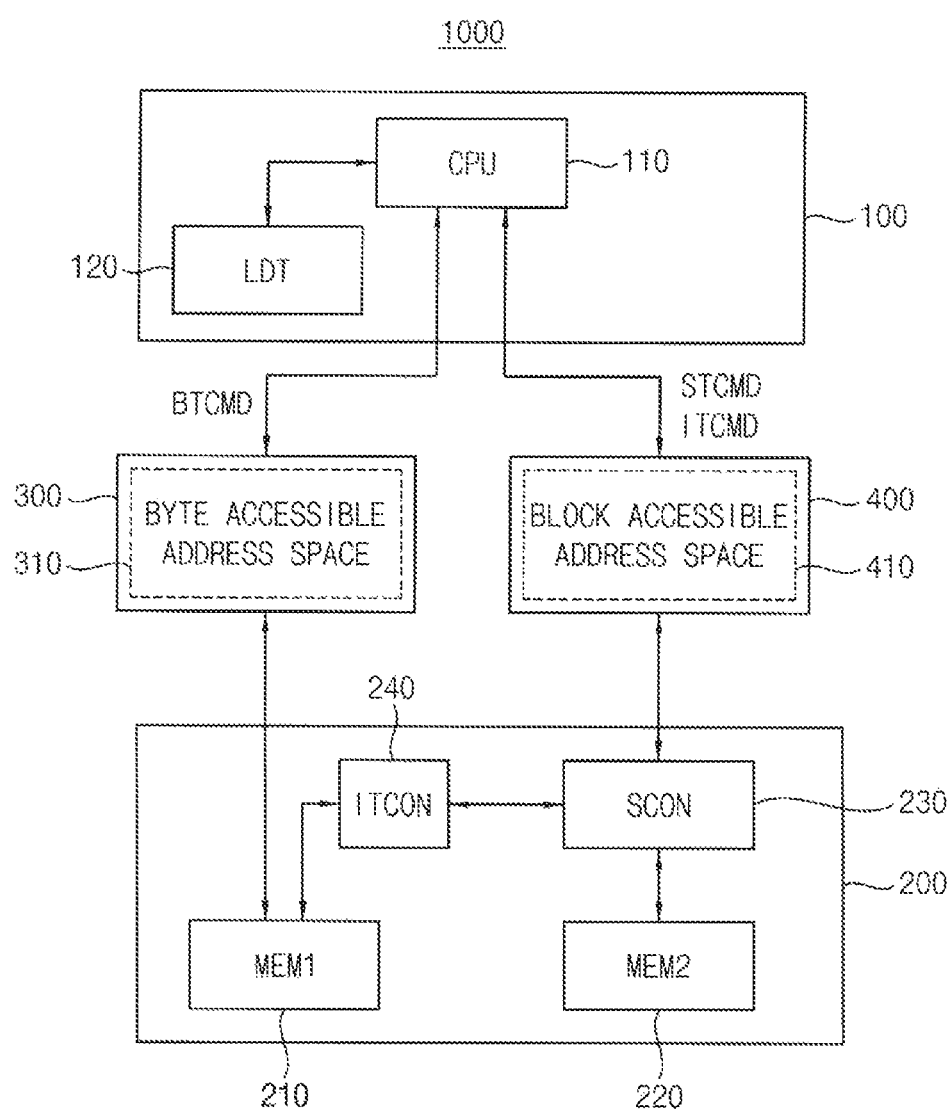
FIG. 2 illustrates a block diagram of an electronic system according to embodiments of the inventive concept.

FIG. 1 illustrates a flow chart of a method of operating an electronic system according to embodiments of the inventive concept, and FIG. 2 illustrates a block diagram of an electronic system according to embodiments of the inventive concept.

Referring to FIGS. 1 and 2, a first memory device included in a storage device 200 is accessed by units of a byte through a byte accessible interface 300, by a host device 100 (S10), and a second memory device included in the storage device 200 is accessed by units of a block through a block accessible interface 400, by the host device 100 (S20). An internal data transfer is performed between the first memory device 210 and the second memory device 220 based on an internal transfer command ITCMD that is provided from the host device 100 to the storage device 200 through the block accessible interface 400 (S30).

As will be described below with reference to FIGS. 6 through 33, after data stored at an address of the second memory device 220 is loaded to an address of the first memory device 210, the host device 100 may store a mapping relation between the address of the first memory device 210 and the address of the second memory device 220 as mapping information MIF. The host device 100 may control overall operations for accessing the storage device 200 based on the mapping information MIF.

A nonvolatile storage device having a conventional block accessible interface is inefficient because it must transfer data of a minimum block size such as 512, 1 k, 2 k, 4 k or 8 k bytes, etc. that is defined between the host device and the storage device, even though data transfer less than the minimum block size may be required. When a byte accessible interface is used for small-size data transfer, all data in the storage device may not be exposed to the host device if the byte accessible interface region is smaller than the entire memory capacity of the storage device, and thus additional caching and pinning processes are required.

The method of operating the electronic system according to embodiments of the inventive concept may efficiently support the access by units of a byte and the access by units of a block between the host device and the storage device by performing internal data transfer in the storage device using the internal transfer command that is modified from the existing block access command. Modifying the existing command in the block accessible interface for the internal data transfer within the storage device may be more efficient than implementing a new command in the byte accessible interface.

Referring to FIG. 2, an electronic system 1000 includes a host 100 and a storage device 200. The host device 100 may include a load table LDT 120 and a processor 110 such as a central processing unit (CPU). The storage device 200 includes a first memory device MEM1 210, a second memory device MEM2 220, a storage controller SCON 230 and an internal transfer controller ITCON 240.

The load table 120 may store mapping information MIF. As will be described below with reference to FIG. 6 through 33, the mapping information MIF may represent the mapping relation between a logic address LA of the first memory device 210 and a logic block address LBA of the second memory device 220 when a data block stored at the logic block address LBA of the second memory device 220 is loaded to the logic address LA of the first memory device 210.

The processor 110 may, based on the mapping information MIF, generate a byte access command BTCMD to access the first memory device 210, a block access command STCMD to access the second memory device 220 and an internal transfer command ITCMD for the internal data transfer. The processor 110 may determine based on the mapping information MIF whether the data block of the second memory device 220 is loaded to the first memory device 210, and perform selectively the access by units of a byte to the first memory device 210 or the access by units of a block to the second memory device 220 based on the determination.

The internal transfer controller 240 may perform the internal data transfer between the first memory device 210 and the second memory device 220. The storage controller 230 may receive the block access command STCMD and the internal transfer command ITCMD through the block accessible interface 400. The storage controller 230 may perform the access by units of a block to the second memory device 220 based on the block access command STCMD and control the internal data transfer of the internal transfer controller 240 based on the internal transfer command ITCMD.

Each of the byte accessible interface 300 and the block accessible interface 400 may be implemented with hardware such as a bus system, software such drive program or combination of hardware and software.

In some embodiments of the inventive concept, the first memory device 210 of the storage device 200 may be connected to the processor 110 of the host device 100 through the byte accessible interface 300 which may include for example a peripheral component interconnect-express (PCIe) bus or the like. The storage device 200 may use a byte accessible address space 310 corresponding to a size of the first memory device 210 to provide the byte accessible interface 300 to the host device 100, for allowing the access by units of a byte with respect to the data stored in the first memory device 210. In other words, the byte accessible address space 310 may have the same access size as the first memory device 210.

In some embodiments of the inventive concept, the second memory device 220 of the storage device 200 may be connected to the processor 110 of the host device 100 through the block accessible interface 400 which may include for example a serial advanced technology attachment (SATA) bus, a nonvolatile memory express (NVMe) bus, a serial attached SCSI (SAS) bus, or the like. The storage device 200 may use a block accessible address space 410 corresponding to an access size of the second memory device 220 to provide the block accessible interface 400 to the host device 100, for allowing the access by units of a block with respect to the data stored in the second memory device 220.

The first memory device 210 may be an arbitrary memory device that may be accessed by the host device 100 through the byte accessible interface 300, as will be described below with reference to FIGS. 35 through 38. The second memory device 220 may be an arbitrary memory device that may be accessed by the host device 100 through the block accessible interface 400, as will be described below with reference to FIGS. 39A and 39B.

FIG. 3A illustrates a diagram of an example format of a command that is transferred through a block accessible interface in an electronic system, FIG. 3B illustrates a diagram of an example format of a lowest double word included in the command of FIG. 3A, and FIG. 3C illustrates a diagram of an example operation code included in the lowest double word of FIG. 3B.

Referring to FIG. 3A, each command may have a predetermined size, for example, 64 bytes. In FIG. 3A, a lowest double word CDW0 may be common to all commands. A double word corresponds to four bytes. A namespace identifier (NSID) field may specify a namespace ID to which a command is applied. If the namespace ID is not used for the command, then NSID field may be cleared to 0h. The 08 through 15 bytes may be reserved. A metadata pointer (MPTR) field may be valid and used only if the command includes metadata. A physical region page (PRP) entry field may specify data used by the command. The upper double words CDW10 through CDW15 may have specific usage for each command.

Referring to FIG. 3B, an operation code (OPC) field may specify a code of the command to be executed as illustrated in FIG. 3C. A fused operation (FUSE) code may specify whether the command is part of a fused operation. The 10th through 13th bits may be reserved. A PRP or scatter gather list (SGL) for data (PSDT) field may specify whether PRPs or SGLs are used for any data transfer associated with the command. A command identifier (CID) field may specify a unique identifier for the command.

In FIG. 3C, "b" represents a binary value and "h" represents a hexadecimal value. "O" represents "optional" and "M" represents "mandatory". The value 00b of OPCODE (01:00) may represent that the data transfer between the host device 100 and the storage device 200 does not occur, the value 01b of OPCODE(01:00) may represent the data is transferred from the host device 100 to the storage device 200, and the value 01b of OPCODE(01:00) may represent the data is transferred from the storage device 200 to the host device 100.

The value 0b of OPCODE(07) may represent the block access command STCMD and the value 1b of OPCODE(07) may represent the internal transfer command ITCMD as described above. According to embodiments of the inventive concept, at least some of the internal transfer command ITCMD may be defined using the reserved code values with the value 1b of OPCODE(07).

The commands FL, WR, RD, WU, CP, WZ and DM corresponding to the block access command STCMD may be, for example, standard commands that are specified in the NVMe standards.

The commands LD, SWR, CB, LBU, LRS, BU and DR corresponding to the internal transfer command ITCMD may be those that are defined according to embodiments of the inventive concept for controlling the internal data transfer between the first memory device 210 and the second memory device 220 in the storage device 200. The values of OPCODE(07:00) for defining the commands LD, SWR, CB, LBU, BU and DR in FIG. 3C are non-limiting examples. The values of OPCODE(07:00) may be determined variously so long as the commands may be differentiated from each other. The commands LD, SWR, CB, LBU, LRS, BU and DR will be described below with reference to FIGS. 6 through 33.

Figure 4:
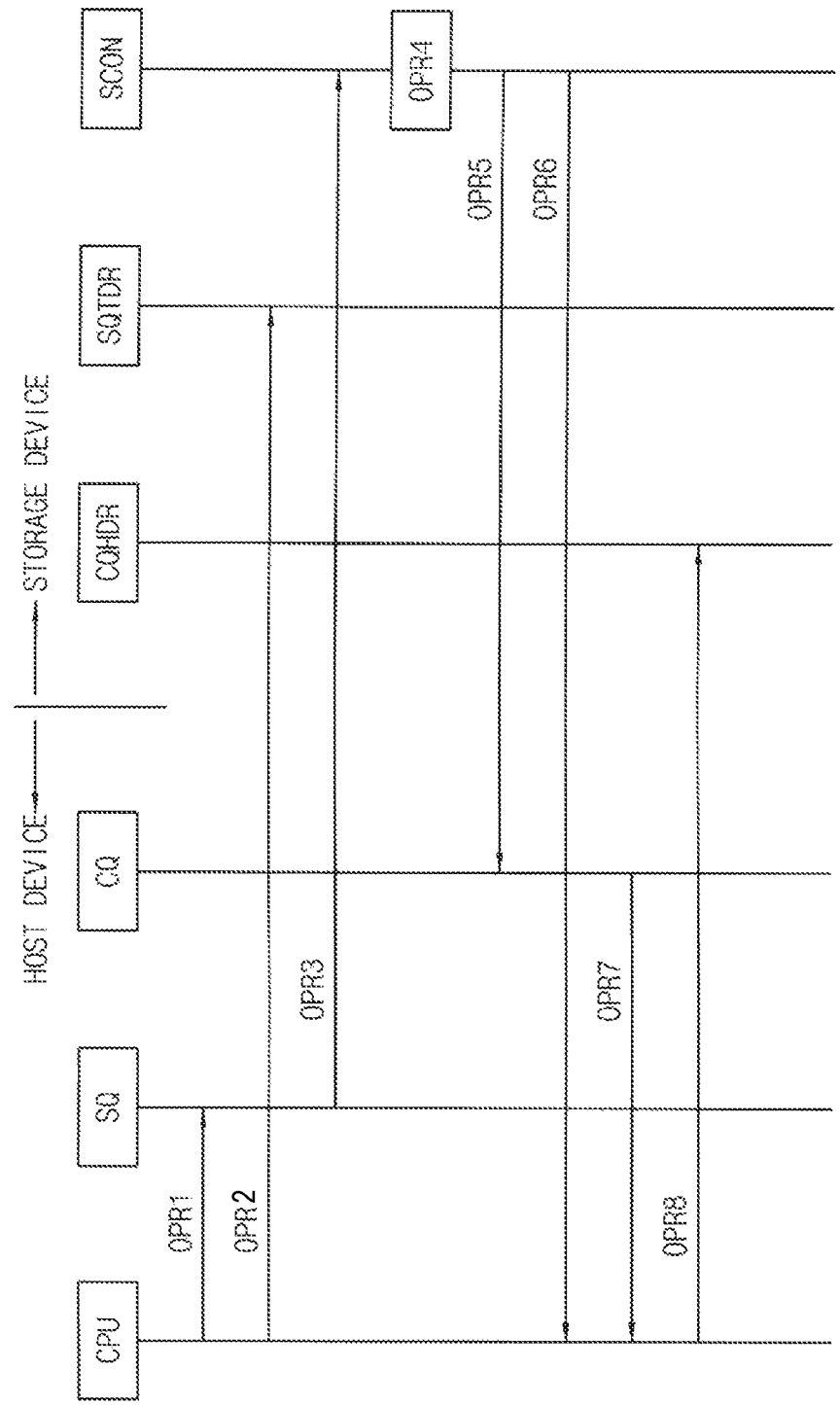
FIG. 4 illustrates a diagram of an example of command processing through a block accessible interface in the electronic system of FIG. 2.

FIG. 4 illustrates a diagram of an example of command processing through a block accessible interface in the electronic system of FIG. 2.

Referring to FIG. 4, according to the NVMe standards, a host device may include a processor CPU, a submission queue (SQ) and a completion queue (CQ), and a storage device may include a storage controller (SCON), a submission queue tail doorbell register (SQTDR) and a completion queue head doorbell register (CQHDR).

In a first operation OPR1, the CPU creates a command for execution which is placed within the SQ.

In a second operation OPR2, the CPU updates the SQTDR with a new value of the submission queue tail entry pointer. This indicates to the SCON that a new command(s) is submitted for processing.

In a third operation OPR3, the SCON fetches the command(s) in the SQ for future execution.

In a fourth operation OPR4, the SCON proceeds with execution of the next command.

In a fifth operation OPR5, after the command has completed execution, the SCON writes a completion queue entry to the CQ.

In a sixth operation OPR6, the SCON optionally generates an interrupt to the CPU to indicate that there is a completion queue entry to process.

In a seventh operation OPR7, the CPU processes the completion queue entry in the CQ.

In an eighth operation OPR8, the CPU writes to the CQHDR to indicate that the completion queue entry has been processed.

As such, issue and completion of the command may be processed between the host device and the storage device.

Figure 5:
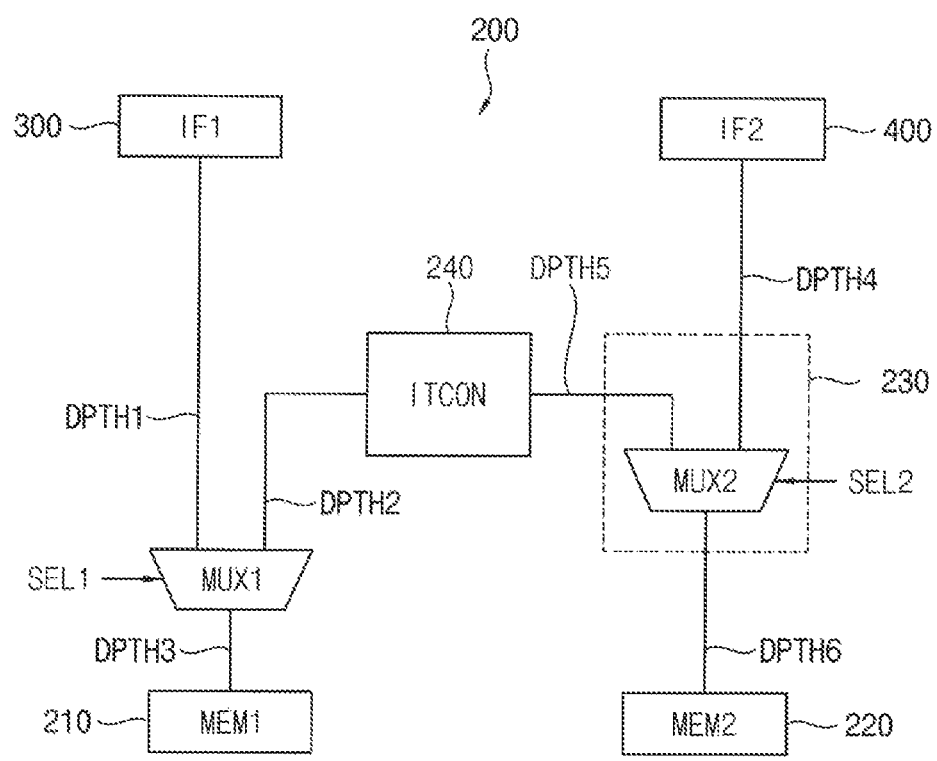
FIG. 5 illustrates a diagram of a data path control in a storage device according to embodiments of the inventive concept.

FIG. 5 illustrates a diagram of a data path control in a storage device according to embodiments of the inventive concept.

Referring to FIG. 5, the storage device 200 includes the first memory device MEM1 210, the second memory device MEM2 220, the storage controller 230 and the internal transfer controller ITCON 240 as described above. The storage device may further include a first path selector MUX1 and a second path selector MUX2.

The first path selector MUX1 may connect one of a first data path DPTH1 and a second data path DPTH2 to a third data path DPTH3 in response to a first selection signal SEL1. The second path selector MUX2 may connect one of a fourth data path DPTH4 and a fifth data path DPTH5 to a sixth data path DPTH6 in response to a second selection signal SEL2.

Accordingly, the first path selector MUX1 may connect the data path DPTH3 connected to the first memory device 210 selectively to the byte accessible interface IF1 300 or the internal transfer controller 240, and the second path selector MUX2 may connect the data path DPTH6 connected to the second memory device 220 selectively to the block accessible interface IF2 400 or the internal transfer controller 240.

The storage controller 230 may control the values of the selection signal SEL1 and SEL2 according to whether the command provided through the block accessible interface 400 is a block access command STCMD or an internal transfer command ITCMD. In other words, the storage controller 230 may control the values of the selection signals SEL1 and SEL2 so that the data path DPTH3 connected to the first memory device 210 and the data path DPTH6 connected to the second memory device 220 may be connected to the internal transfer controller 240 to perform the internal data transfer when the command transferred through the block accessible interface 400 is the internal transfer command ITCMD.

Hereinafter, example embodiments of operating an electronic system according to example embodiments are described with reference to FIGS. 6 through 33.

In FIGS. 7, 11, 15, 19, 23, 27 and 31, although OPC values of the commands LD, SWR, CB, LBU, LRS, BU and DR are illustrated as those values in FIG. 3C, the values are not limited thereto. A source address field SRC may include an address from which data is read and a destination address field DST may include an address to which data is written.

The components in FIGS. 8, 12, 16, 20, 24, 28 and 32 may be the same as the corresponding components described with reference to FIG. 2. Accordingly, repeated descriptions may be hereinafter omitted, whereby flows of data and commands are described.

FIGS. 9, 13, 17, 21, 25, 29 and 33 illustrate storage states 120a, 210a and 220a of the load table 120, the first memory device 210 and the second memory device 220 before the operation by each command is performed, and storage states 120b, 210b and 220b of the load table 120, the first memory device 210 and the second memory device 220 after the operation by each command is completed. "EM" represents that the storage unit of the load table 120 is in an empty state.

A logic address LA represents an address of the first memory device 210 and a logic block address LBA represents an address of the second memory device 220. After data stored at the logic block address LBA of the second memory device 220 is loaded to the logic address LA of the first memory device 210, a mapping relation between the logic address LA of the first memory device 210 and the logic block address LBA of the second memory device 220 is stored in the load table 120 as mapping information MIF.

For example, after a first data block DBa stored at a first logic block address LBa of the second memory device 220 is loaded to a first logic address LAa of the first memory device 210, the first logic block address LBa and the first logic address LAa may be stored in the load table as one combination. In the same way, after a second data block DBb stored at a second logic block address LBb of the second memory device 220 is loaded to a second logic address LAb of the first memory device 210, the second logic block address LBb and the second logic address LAb may be stored in the load table as another combination.

Figure 6:
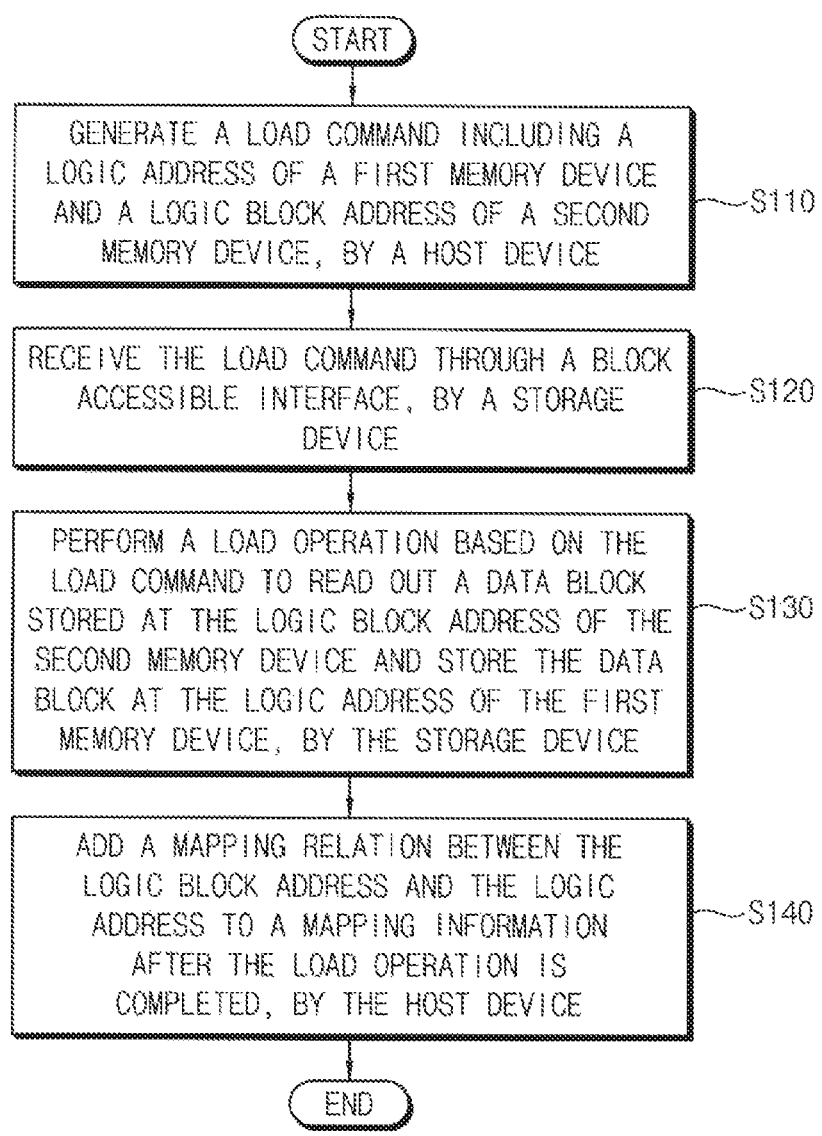
FIG. 6 illustrates a flow chart of a load operation in an electronic system according to embodiments of the inventive concept.
Figure 7:
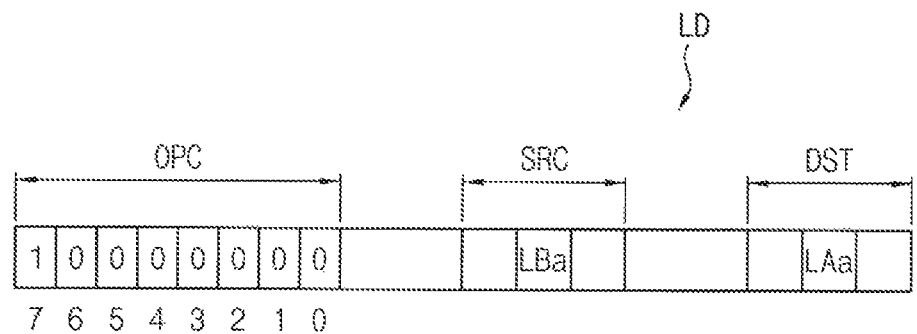
FIG. 7 illustrates a diagram of an example of a load command for the load operation of FIG. 6.
Figure 8:
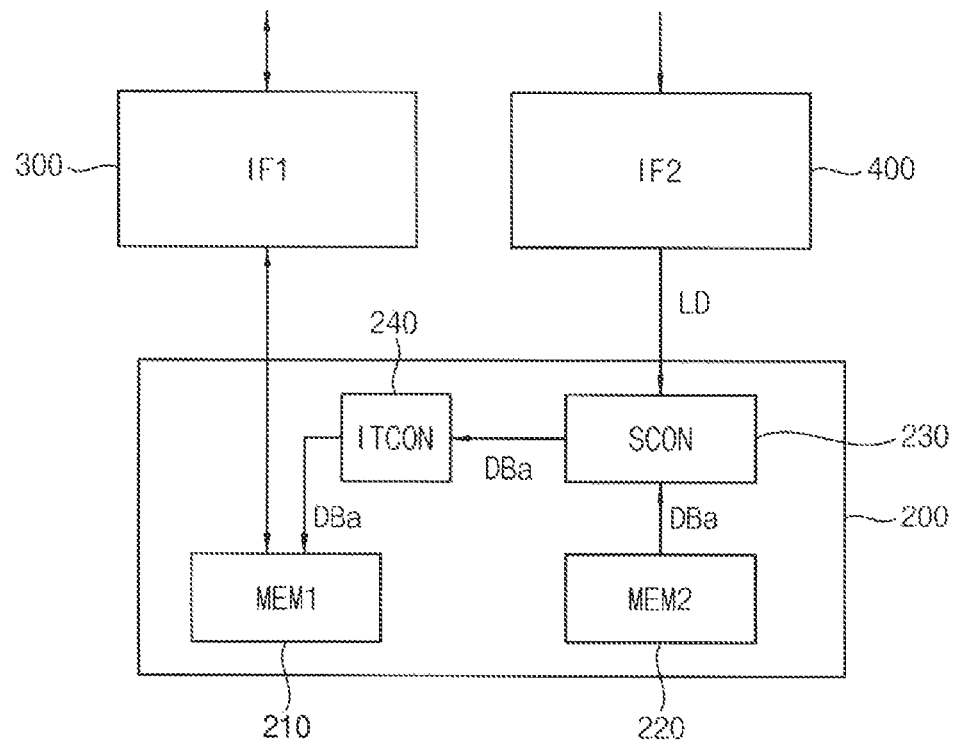
FIG. 8 illustrates a diagram of signal flow in the load operation of FIG. 6.
Figure 9:
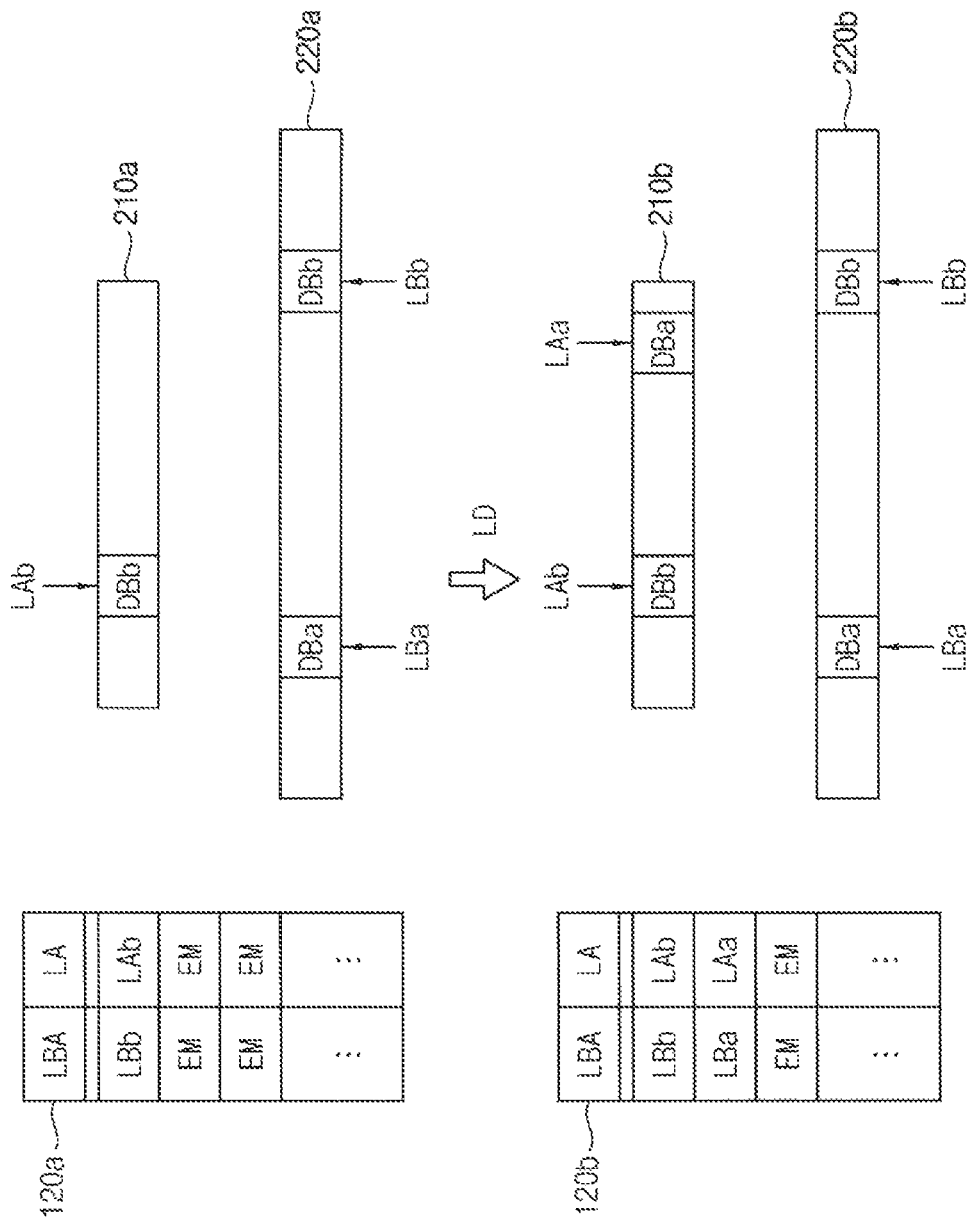
FIG. 9 illustrates a diagram of storage states of the load table and the memory devices according to the load operation of FIG. 6.

FIG. 6 illustrates a flow chart of a load operation in an electronic system according to embodiments of the inventive concept. FIG. 7 illustrates a diagram of an example of a load command for the load operation of FIG. 6. FIG. 8 illustrates a diagram of signal flow in the load operation of FIG. 6. FIG. 9 illustrates a diagram of storage states of the load table and the memory devices according to the load operation of FIG. 6.

Referring to FIGS. 2, 6 through 9, the host device 100 generates a load command LD including a first logic address LAa of the first memory device 210 and a first logic block address LBa of the second memory device 220 (S110). The storage controller 230 of the storage device 200 receives the load command LD through the block accessible interface 400 (S120). To perform a load operation based on the load command LD, the storage controller 230 reads out a first data block DBa stored at the first logic block address LBa of the second memory device 220 and the internal transfer controller 240 stores the first data block DBa at the first logic address LAa of the first memory device 210 (S130). The processor 110 of the host device 100 adds a mapping relation between the first logic block address LBa and the first logic address LAa to the mapping information MIF in the load table 120 after the load operation is completed (S140).

Figure 10:
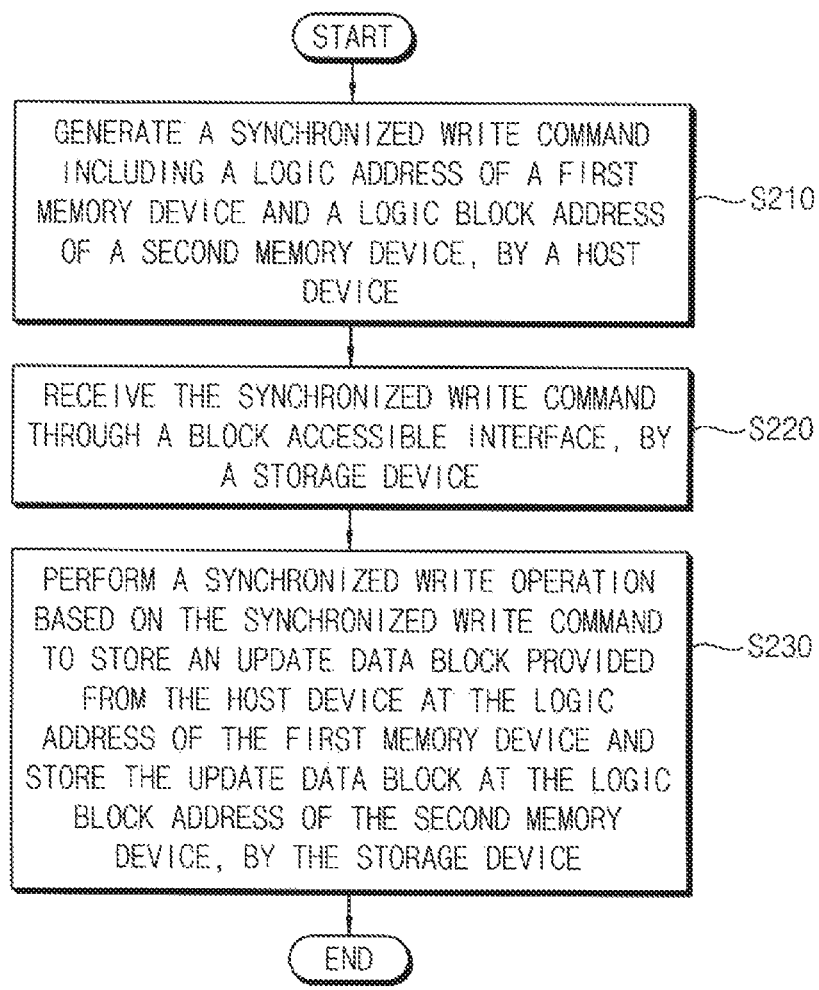
FIG. 10 illustrates a flow chart of a synchronized write operation in an electronic system according to example embodiments.
Figure 11:
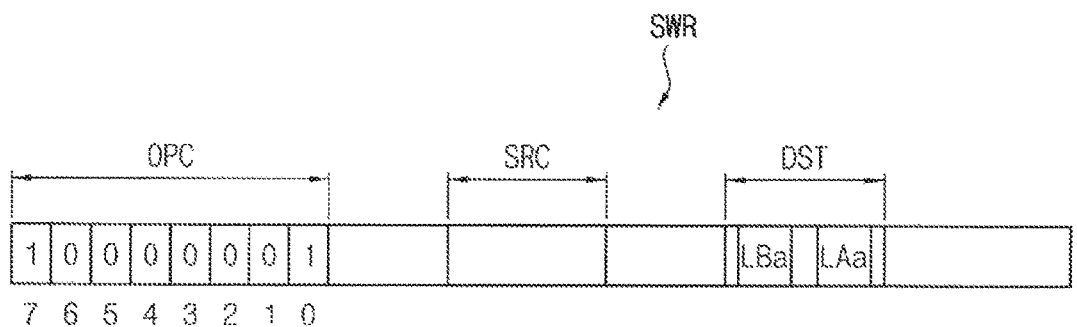
FIG. 11 illustrates a diagram of an example of a synchronized write command for the synchronized write operation of FIG. 10.
Figure 12:
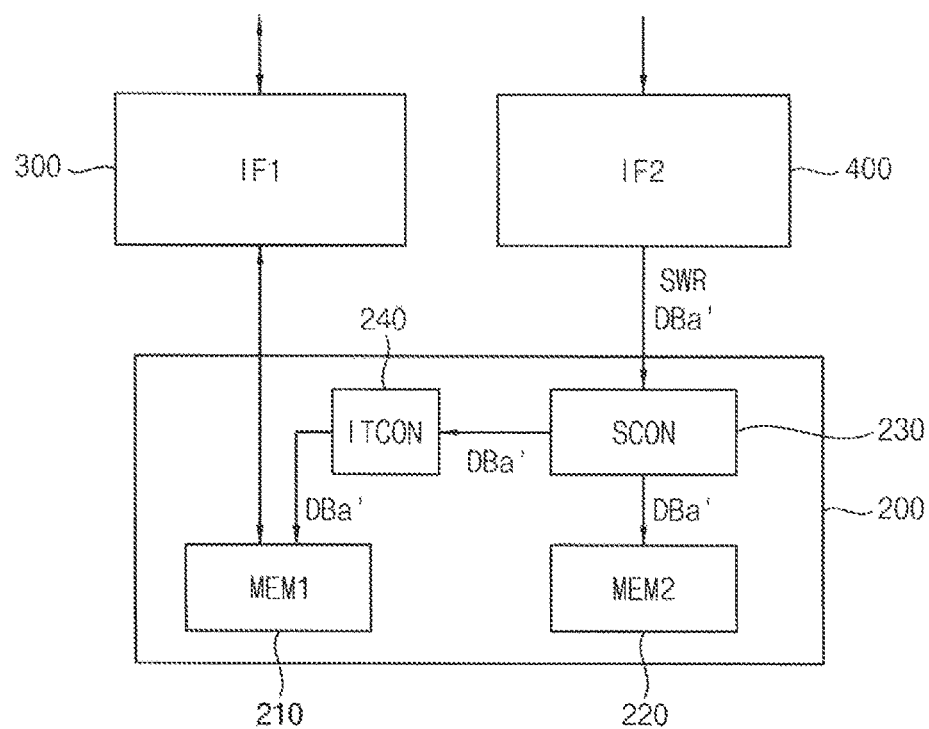
FIG. 12 illustrates a diagram of signal flow in the synchronized write operation of FIG. 10.
Figure 13:
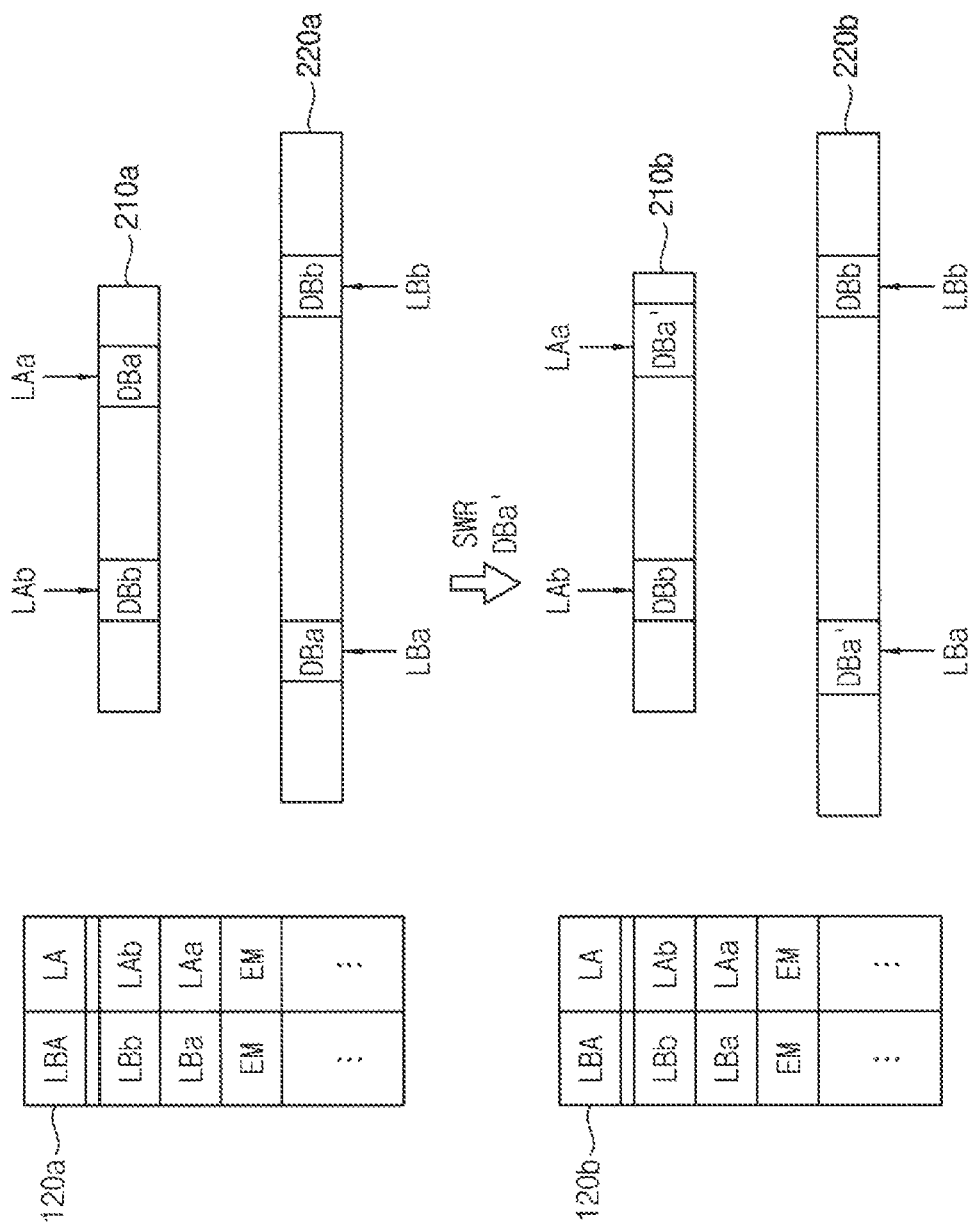
FIG. 13 illustrates a diagram of storage states of the load table and the memory devices according to the synchronized write operation of FIG. 10.

FIG. 10 illustrates a flow chart of a synchronized write operation in an electronic system according to example embodiments. FIG. 11 illustrates a diagram of an example of a synchronized write command for the synchronized write operation of FIG. 10. FIG. 12 illustrates a diagram of signal flow in the synchronized write operation of FIG. 10. FIG. 13 illustrates a diagram of storage states of the load table and the memory devices according to the synchronized write operation of FIG. 10.

Referring to FIGS. 2, 10 through 13, the host device 100 generates a synchronized write command SWR including a first logic address LAa of the first memory device 210 and a first logic block address LBa of the second memory device 220 (S210). The storage controller 230 of the storage device 200 receives the synchronized write command SWR through the block accessible interface 400 (S220). To perform a synchronized write operation based on the synchronized write command SWR, the storage controller 230 stores an updated data block DBa' provided from the host device 100 at the first logic address LAa of the first memory device 210 and the internal transfer controller 240 stores the updated data block DBa' at the first logic block address LBa of the second memory device 220 (S230). In this case, the storage state of the load table 120 after the synchronized write operation is the same as the storage state of the load table 120 before the synchronized write operation.

Figure 14:
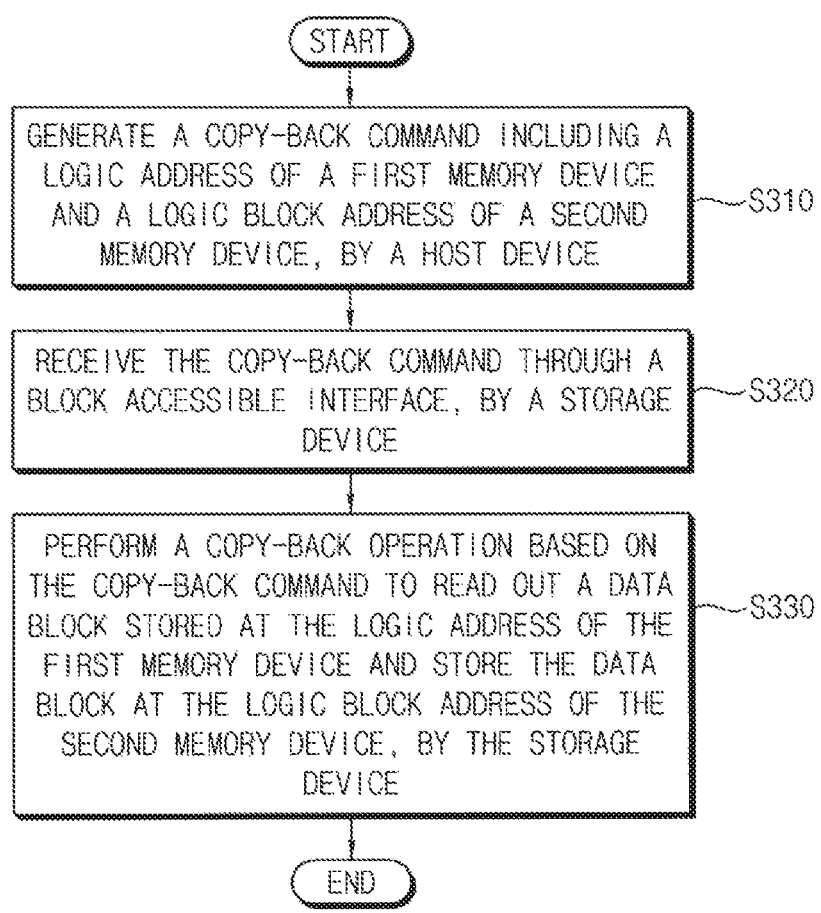
FIG. 14 illustrates a flow chart of a copy-back operation in an electronic system according to embodiment of the inventive concept.
Figure 15:
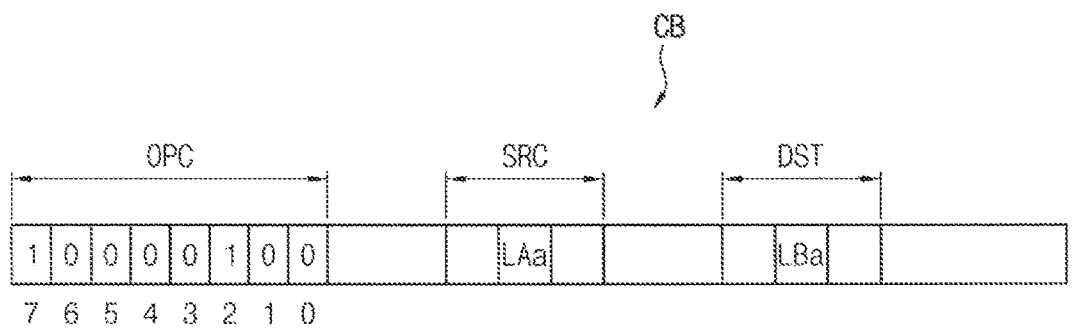
FIG. 15 illustrates a diagram of an example of a copy-back command for the copy-back operation of FIG. 14.
Figure 16:
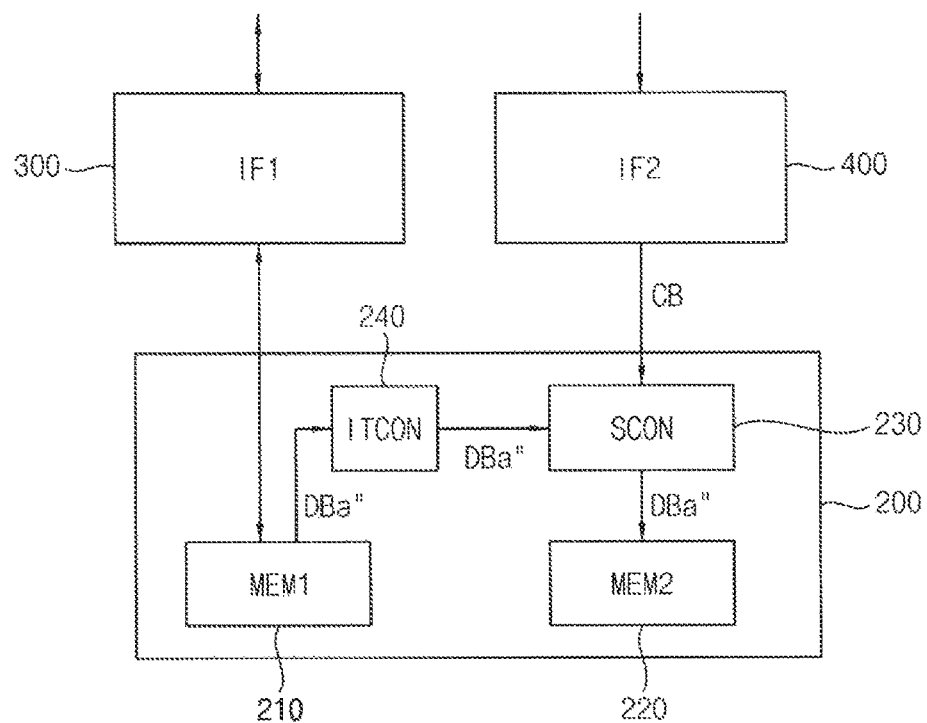
FIG. 16 illustrates a diagram of signal flow in the copy-back operation of FIG. 14.
Figure 17:
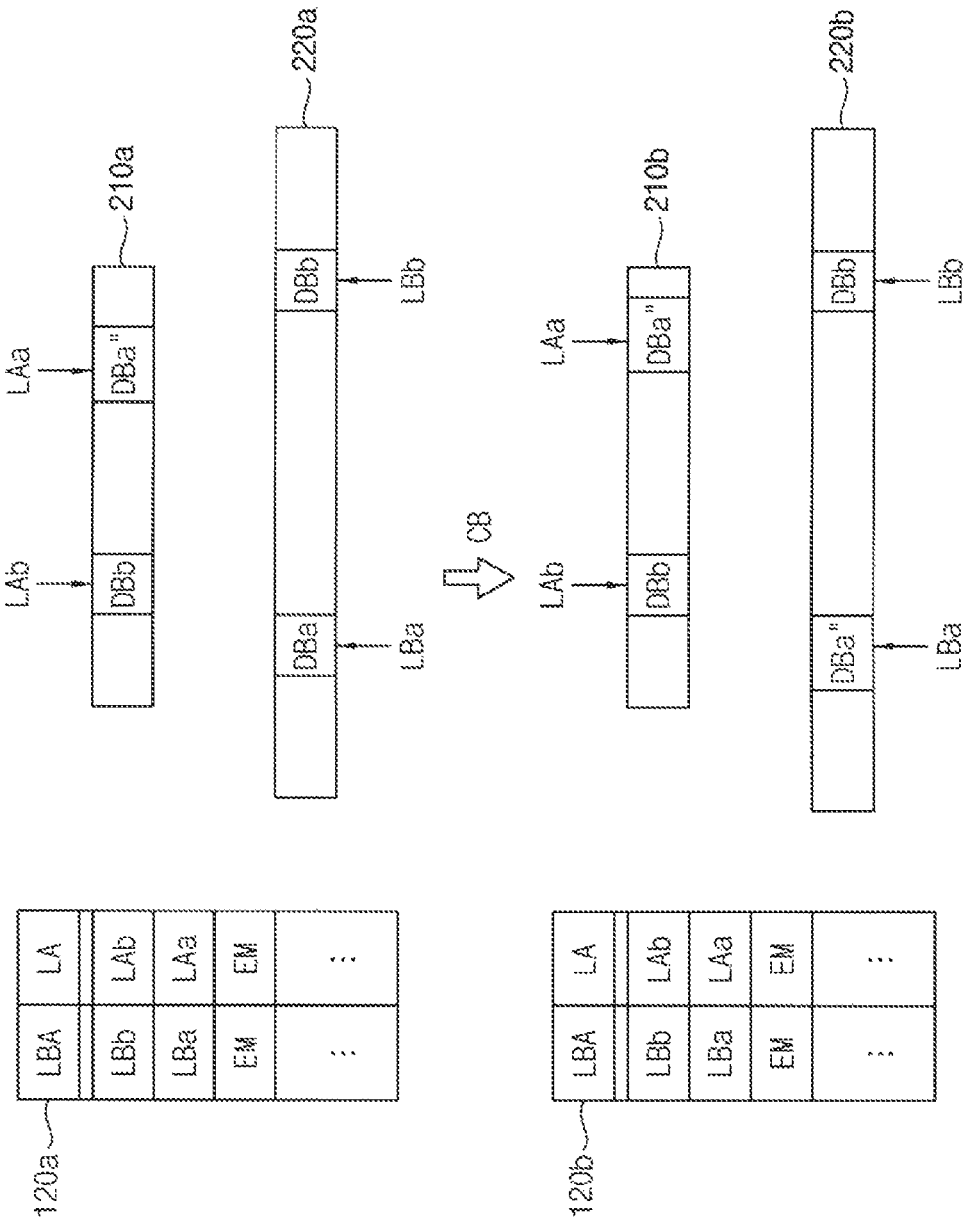
FIG. 17 illustrates a diagram of storage states of the load table and the memory devices according to the copy-back operation of FIG. 14.

FIG. 14 illustrates a flow chart of a copy-back operation in an electronic system according to embodiment of the inventive concept. FIG. 15 illustrates a diagram of an example of a copy-back command for the copy-back operation of FIG. 14. FIG. 16 illustrates a diagram of signal flow in the copy-back operation of FIG. 14. FIG. 17 illustrates a diagram of storage states of the load table and the memory devices according to the copy-back operation of FIG. 14.

Referring to FIGS. 2, 14 through 17, the host device 100 may generate a copy-back command CB including a first logic address LAa of the first memory device 210 and a first logic block address LBa of the second memory device 220 (S310). The storage controller 230 of the storage device 200 receives the copy-back command CB through the block accessible interface 400 (S320). The storage controller 230 performs a copy-back operation based on the copy-back command CB and controls the internal transfer controller 240 to read out a first data block DBa" stored at the first logic address LAa of the first memory device 210, and the storage controller 230 stores the first data block DBa" at the first logic block address LBa of the second memory device 220 (S330). As such, the loaded data block DBa to the first memory device 210 may be corrected through the byte accessible interface 300 and the corrected data block DBa" may replace the original data block DBa in the second memory device 220 through the copy-back operation.

Figure 18:
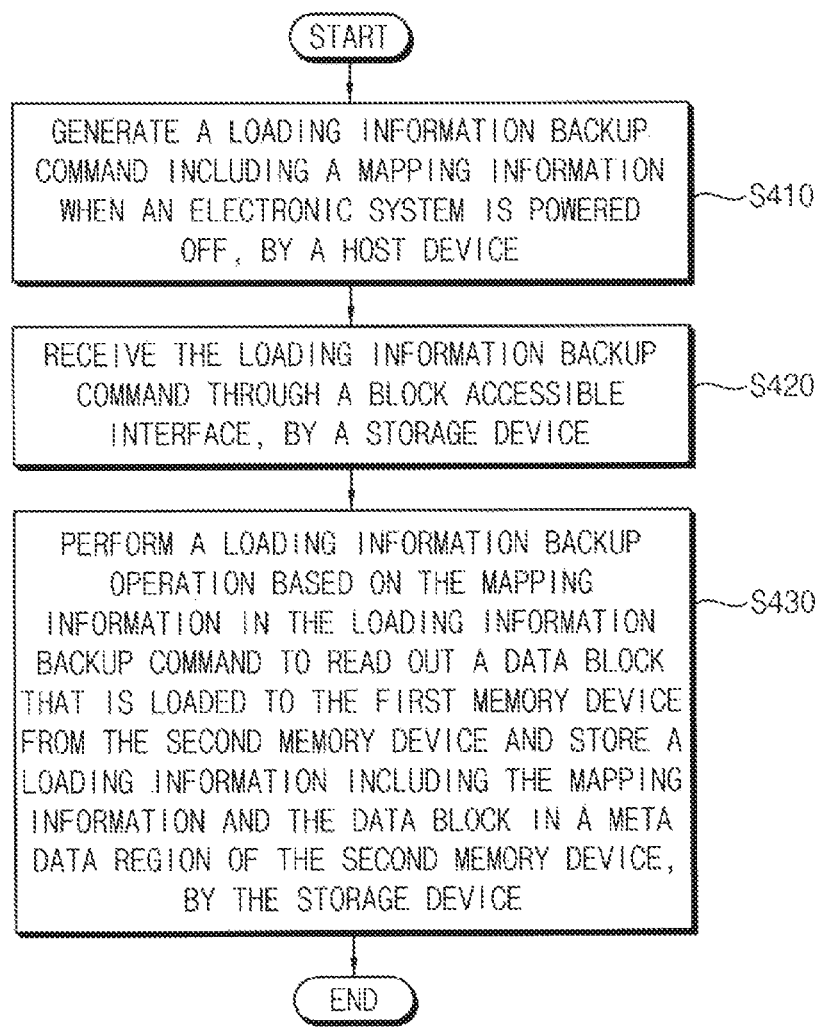
FIG. 18 illustrates a flow chart of a loading information backup operation in an electronic system according to embodiments of the inventive concept.
Figure 19:
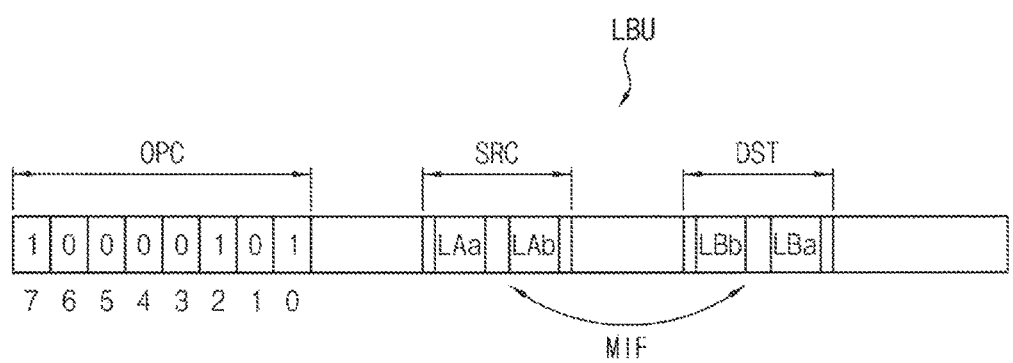
FIG. 19 illustrates a diagram of an example of a loading information backup command for the loading information backup operation of FIG. 18.
Figure 20:
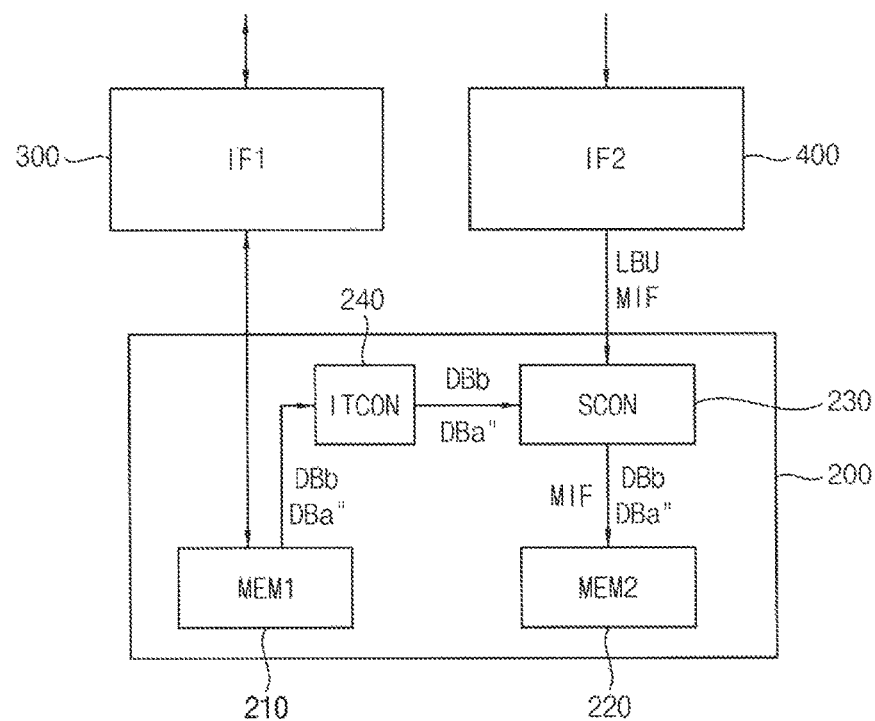
FIG. 20 illustrates a diagram of signal flow in the loading information backup operation of FIG. 18.
Figure 21:
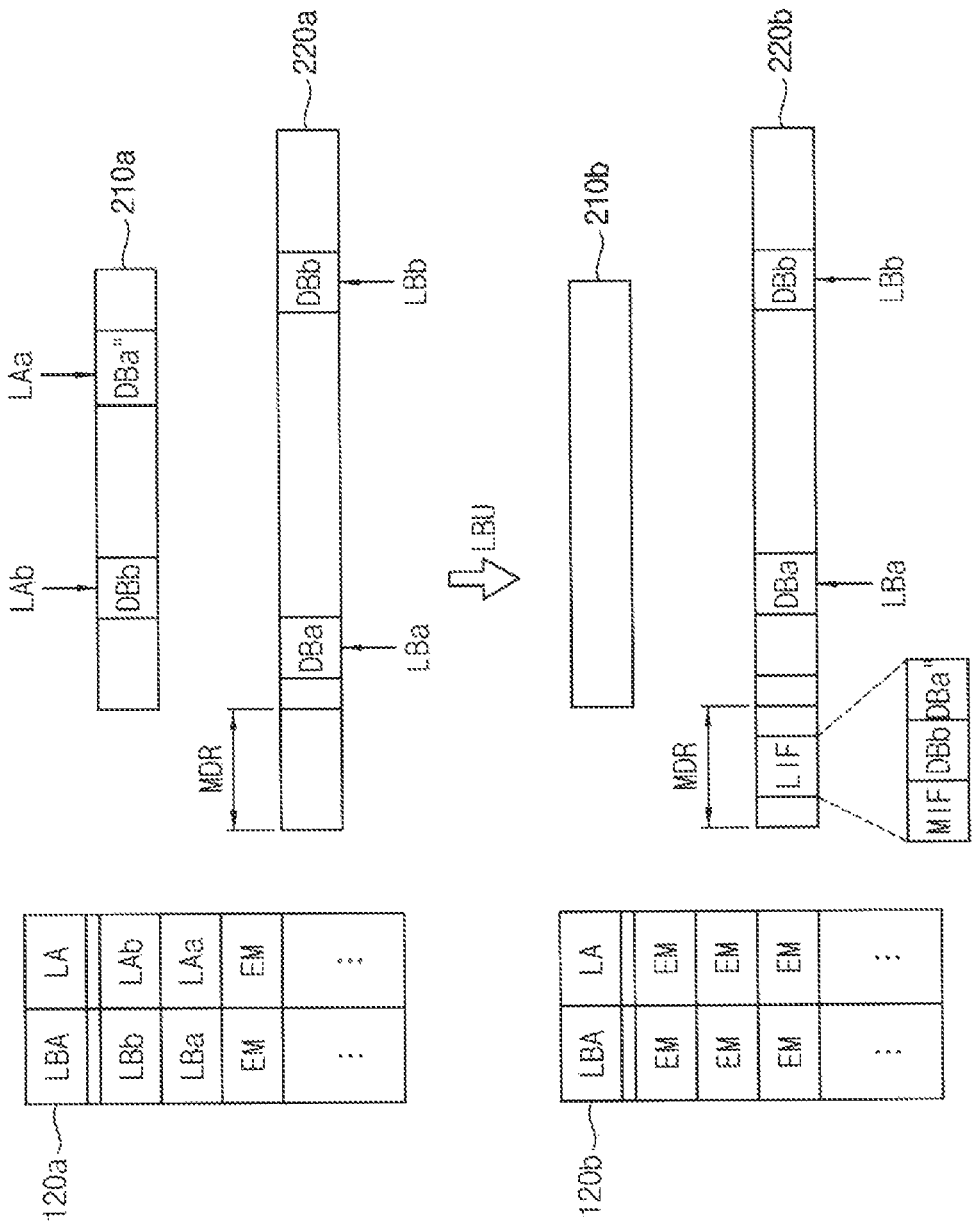
FIG. 21 illustrates a diagram of storage states of the load table and the memory devices according to the loading information backup operation of FIG. 18.

FIG. 18 illustrates a flow chart of a loading information backup operation in an electronic system according to embodiments of the inventive concept. FIG. 19 illustrates a diagram of an example of a loading information backup command for the loading information backup operation of FIG. 18. FIG. 20 illustrates a diagram of signal flow in the loading information backup operation of FIG. 18. FIG. 21 illustrates a diagram of storage states of the load table and the memory devices according to the loading information backup operation of FIG. 18.

Referring to FIGS. 2, 18 through 21, the host device 100 generates a loading information backup command LBU including a mapping information MIF when the electronic system 1000 is powered off (S410). The storage controller 230 of the storage device 200 receives the loading information backup command LBU through the block accessible interface 400 (S420). To perform a loading information backup operation based on the mapping information MIF in the loading information backup command LBU, the internal transfer controller 240 reads out a data block DBa" and a data block DBb that is loaded to the first memory device 210 of the storage device 200, and the storage controller 230 stores a loading information LIF including the mapping information MIF and the data block DBa" and the data block DBb in a meta data region MDR of the second memory device 220 (S430).

In some embodiments of the inventive concept, the storage device 200 may store the same mapping information MIF as the host device 100. In this case, the loading information backup command LBU may not include the mapping information MIF and the storage device 200 may perform the loading information backup operation using the mapping information MIF stored internally. In some embodiments, the storage device 200 may detect the power-off state regardless of the loading information backup command LBU and may then responsive to the detection perform the loading information backup operation.

Figure 22:
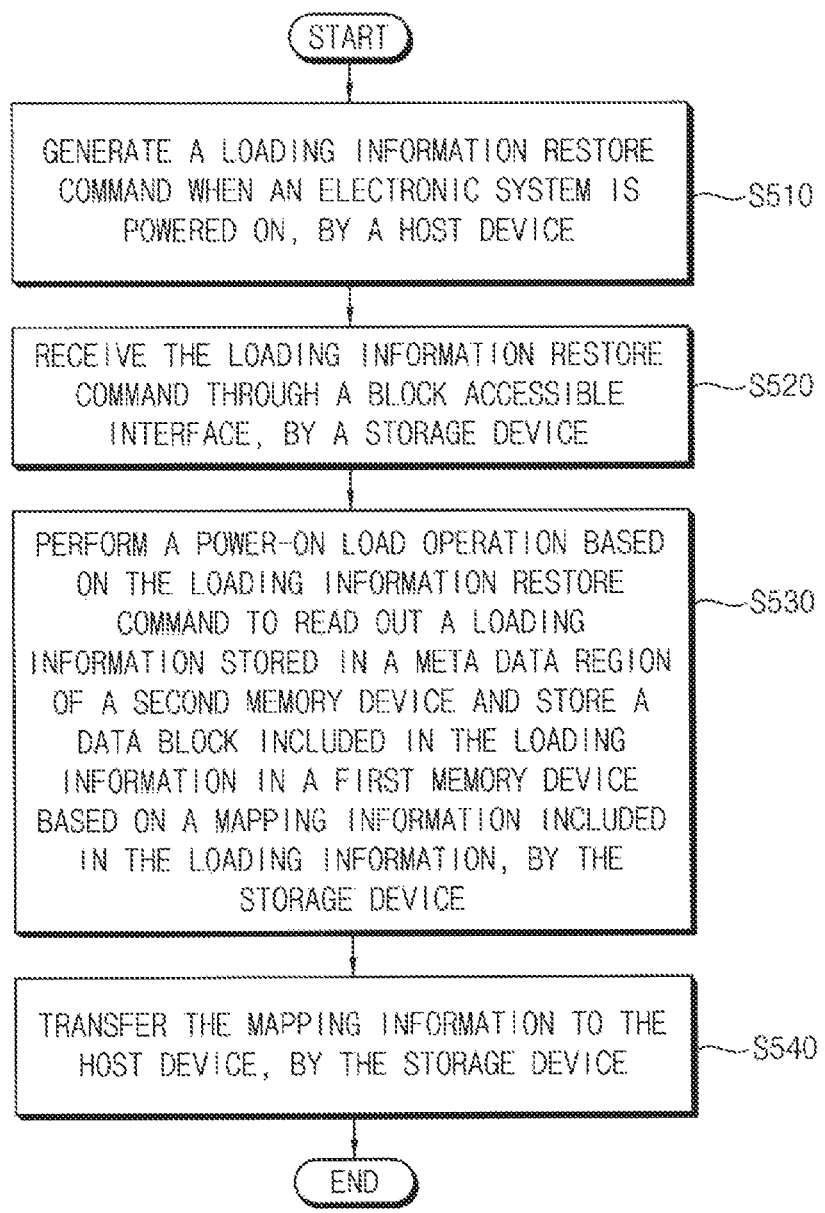
FIG. 22 illustrates a flow chart illustrating a loading information restore operation in an electronic system according to embodiments of the inventive concept.
Figure 23:
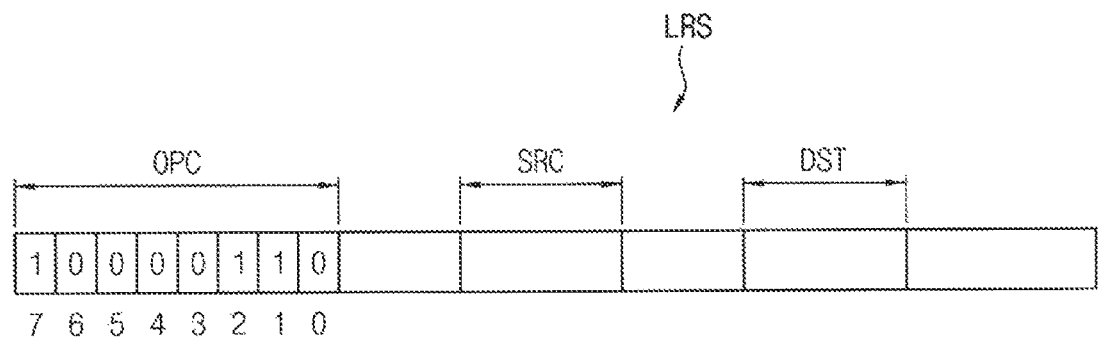
FIG. 23 illustrates a diagram of an example of a loading information restore command for the loading information restore operation of FIG. 22.
Figure 24:
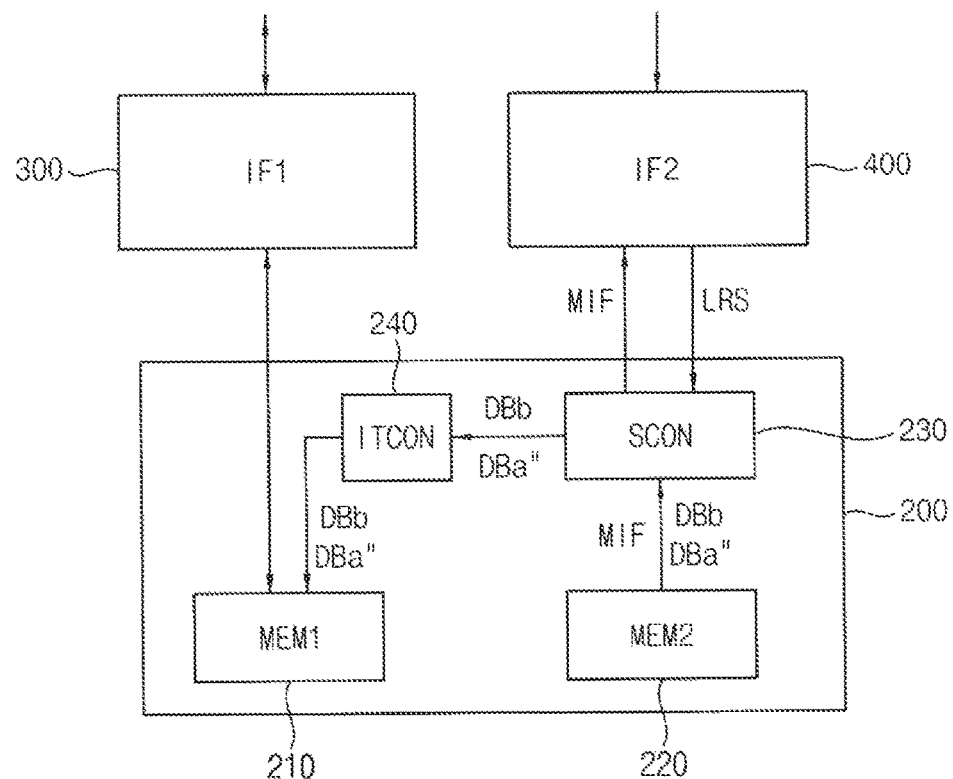
FIG. 24 illustrates a diagram of signal flow in the loading information restore operation of FIG. 22.
Figure 25:
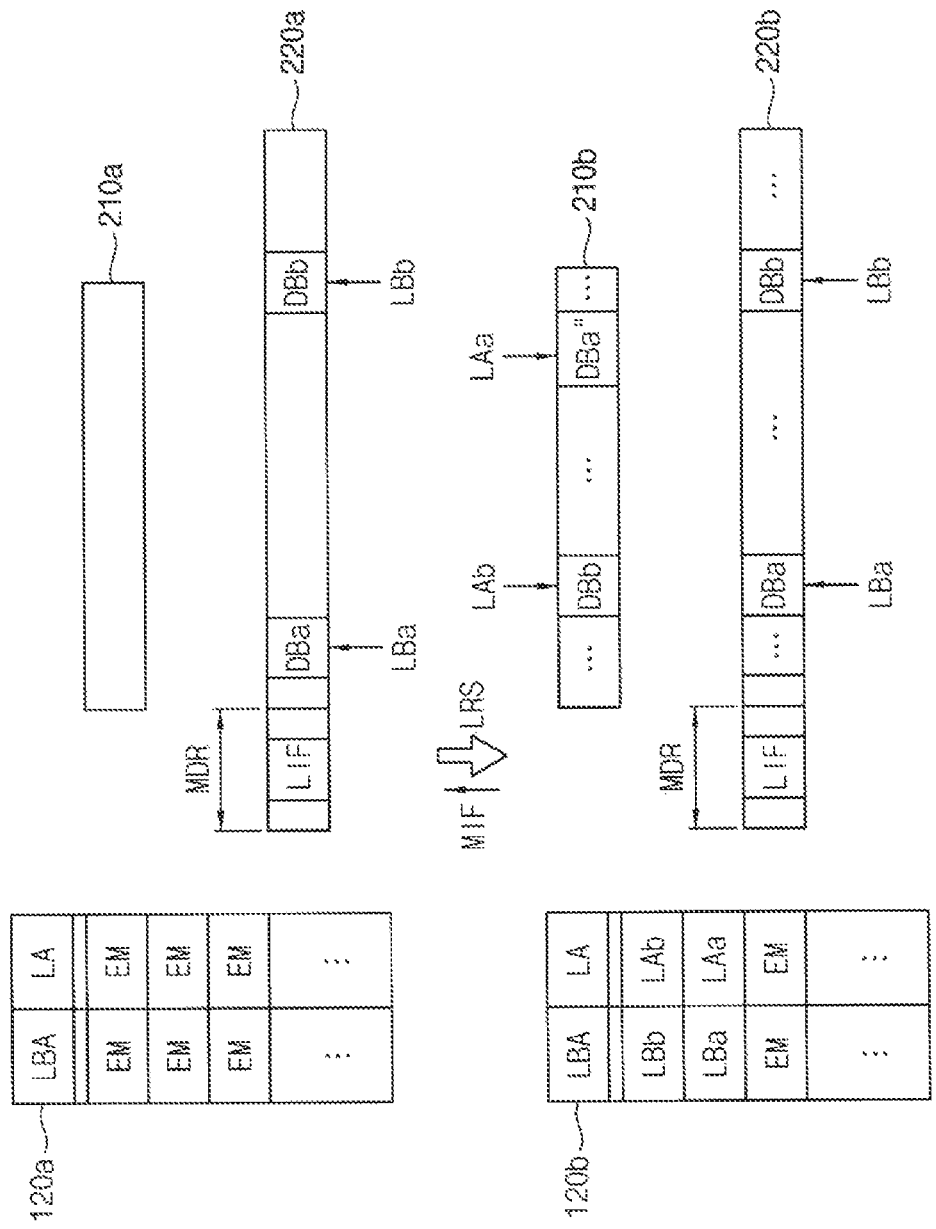
FIG. 25 illustrates a diagram of storage states of the load table and the memory devices according to the loading information restore operation of FIG. 22.

FIG. 22 illustrates a flow chart illustrating a loading information restore operation in an electronic system according to embodiments of the inventive concept. FIG. 23 illustrates a diagram of an example of a loading information restore command for the loading information restore operation of FIG. 22. FIG. 24 illustrates a diagram of signal flow in the loading information restore operation of FIG. 22. FIG. 25 illustrates a diagram of storage states of the load table and the memory devices according to the loading information restore operation of FIG. 22.

Referring to FIGS. 2, 22 through 25, the host device 100 generates a loading information restore command LRS when the electronic system 1000 is powered on (S510). The storage controller 230 of the storage device 200 receives the loading information restore command LRS through the block accessible interface 400 (S520). To perform a power-on load operation based on the loading information restore command LRS, the storage controller 230 reads out a loading information LIF stored in a meta data region MDR of the second memory device 220, and the internal transfer controller 240 stores a data block DBa" and a data block DBb included in the loading information LIF in the first memory device 210 based on the mapping information MIF included in the loading information LIF (S530). The storage controller 230 transfers the mapping information MIF to the host device 100 (S540) and the processor 110 of the host device 100 stores the received mapping information MIF in the load table 120.

In some embodiments of the inventive concept, the storage device 200 may detect the power-on state of the electronic system 1000 regardless of the loading information restore command LRS, and responsive to the detection may perform the power-on load operation. In this case, the loading information restore command LRS may be used to transfer the mapping information MIF from the storage device 200 back to the host device 100.

Through the loading information backup operation during the power-off and the loading information restore operation during the power-on as described with reference to FIGS. 18 through 25, the data loaded to the first memory device 210 by the processor 110 may be maintained after power cycles off and on, or when the power is turned on and off. Accordingly, the loaded state may be restored for rapid access to the required data after the power cycle. In addition, the byte accessible interface may be used continuously before and after the power cycle.

Figure 26:
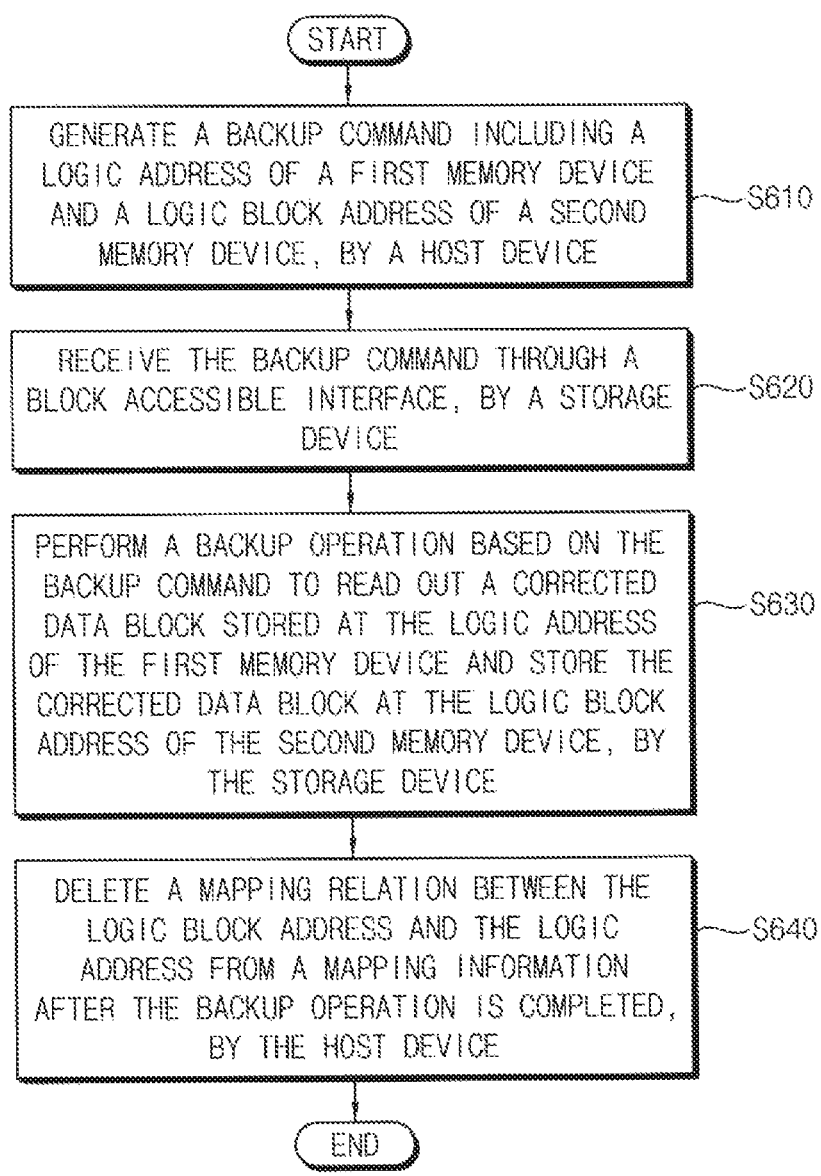
FIG. 26 illustrates a flow chart of a backup operation in an electronic system according to embodiments of the inventive concept.
Figure 27:
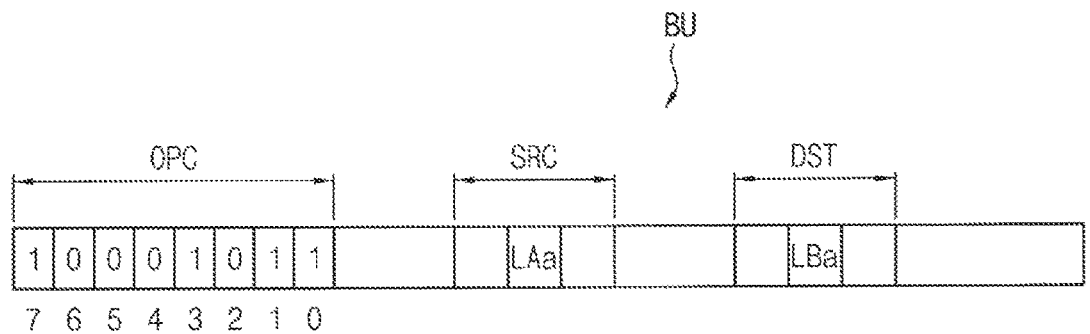
FIG. 27 illustrates a diagram of an example of a backup command for the backup operation of FIG. 26.
Figure 28:
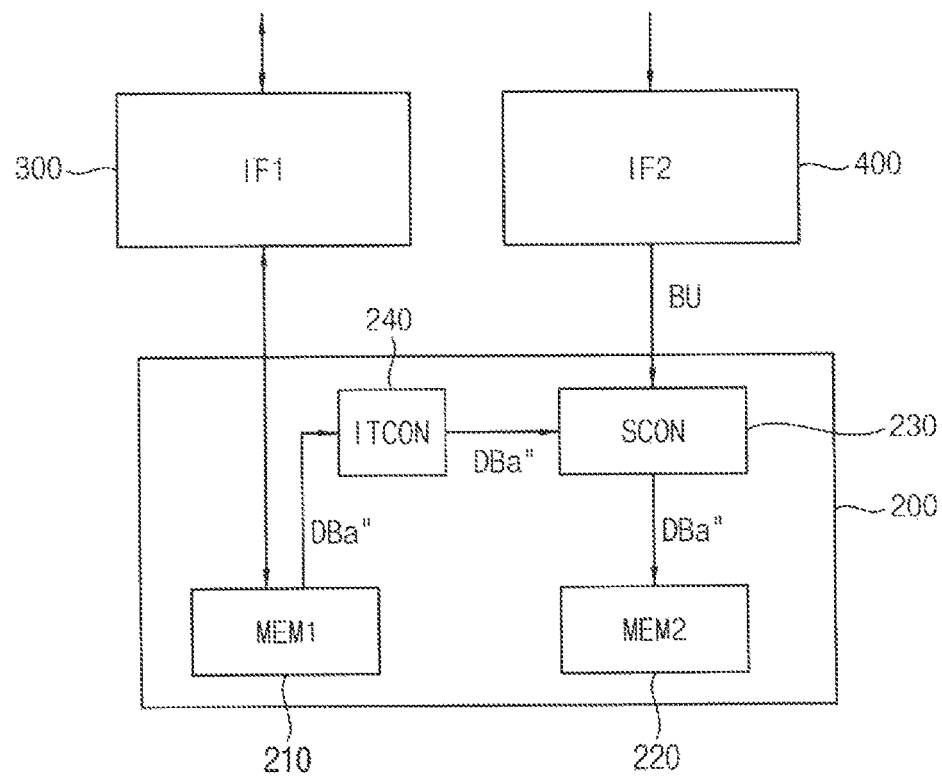
FIG. 28 illustrates a diagram of signal flow in the backup operation of FIG. 26.
Figure 29:
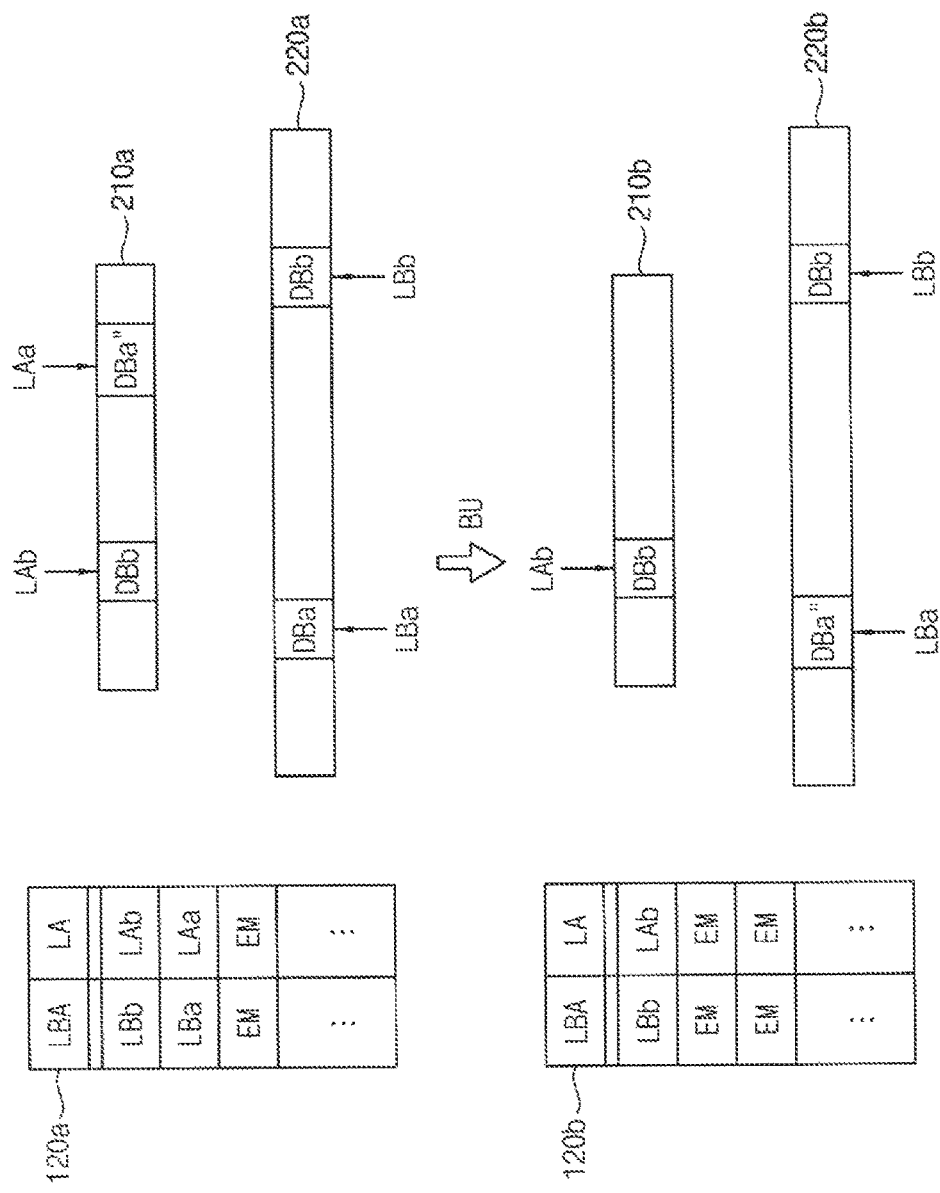
FIG. 29 illustrates a diagram of storage states of the load table and the memory devices according to the backup operation of FIG. 26.

FIG. 26 illustrates a flow chart of a backup operation in an electronic system according to embodiments of the inventive concept. FIG. 27 illustrates a diagram of an example of a backup command for the backup operation of FIG. 26. FIG. 28 illustrates a diagram of signal flow in the backup operation of FIG. 26. FIG. 29 illustrates a diagram of storage states of the load table and the memory devices according to the backup operation of FIG. 26.

Referring to FIGS. 2, 26 through 29, the host device 100 generates a backup command BU including a first logic address LAa of the first memory device 210 and a first logic block address LBa of the second memory device 220 (S610). The storage controller 230 of the storage device 200 receives the backup command BU through the block accessible interface 400 (S620). To perform a backup operation based on the backup command BU, the internal transfer controller 240 of the storage device 200 reads out a corrected data block DBa" stored at the first logic address LAa of the first memory device 210 and the storage controller 230 stores the corrected data block DBa" at the first logic block address LBa of the second memory device 220 (S630). The processor 110 of the host device 100 deletes a mapping relation between the first logic block address LBa and the first logic address LAa from the mapping information MIF in the load table 120 after the backup operation is completed (S640).

Figure 30:
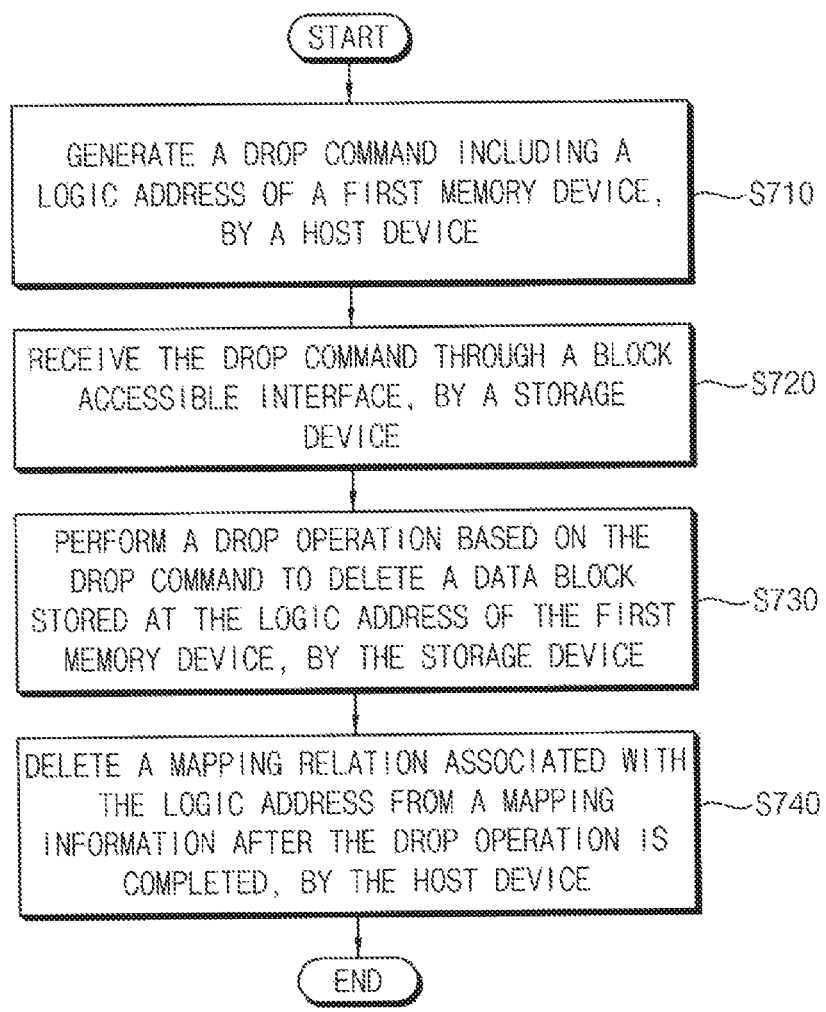
FIG. 30 illustrates a flow chart of a drop operation in an electronic system according to embodiments of the inventive concept.
Figure 31:
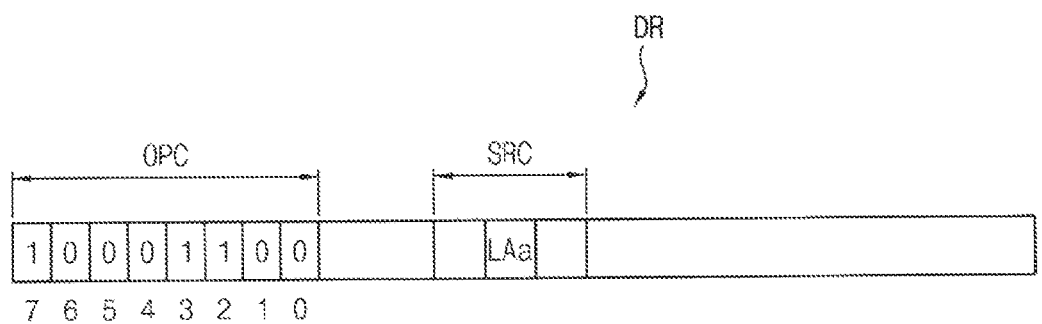
FIG. 31 illustrates a diagram of an example of a drop command for the drop operation of FIG. 30.
Figure 32:
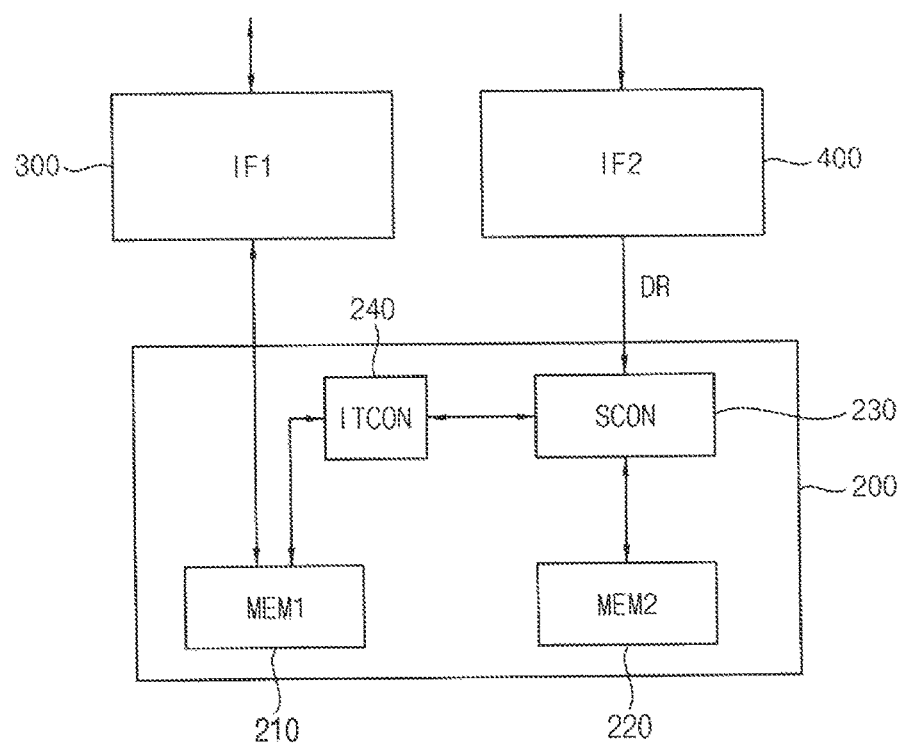
FIG. 32 illustrates a diagram of signal flow in the drop operation of FIG. 30.
Figure 33:
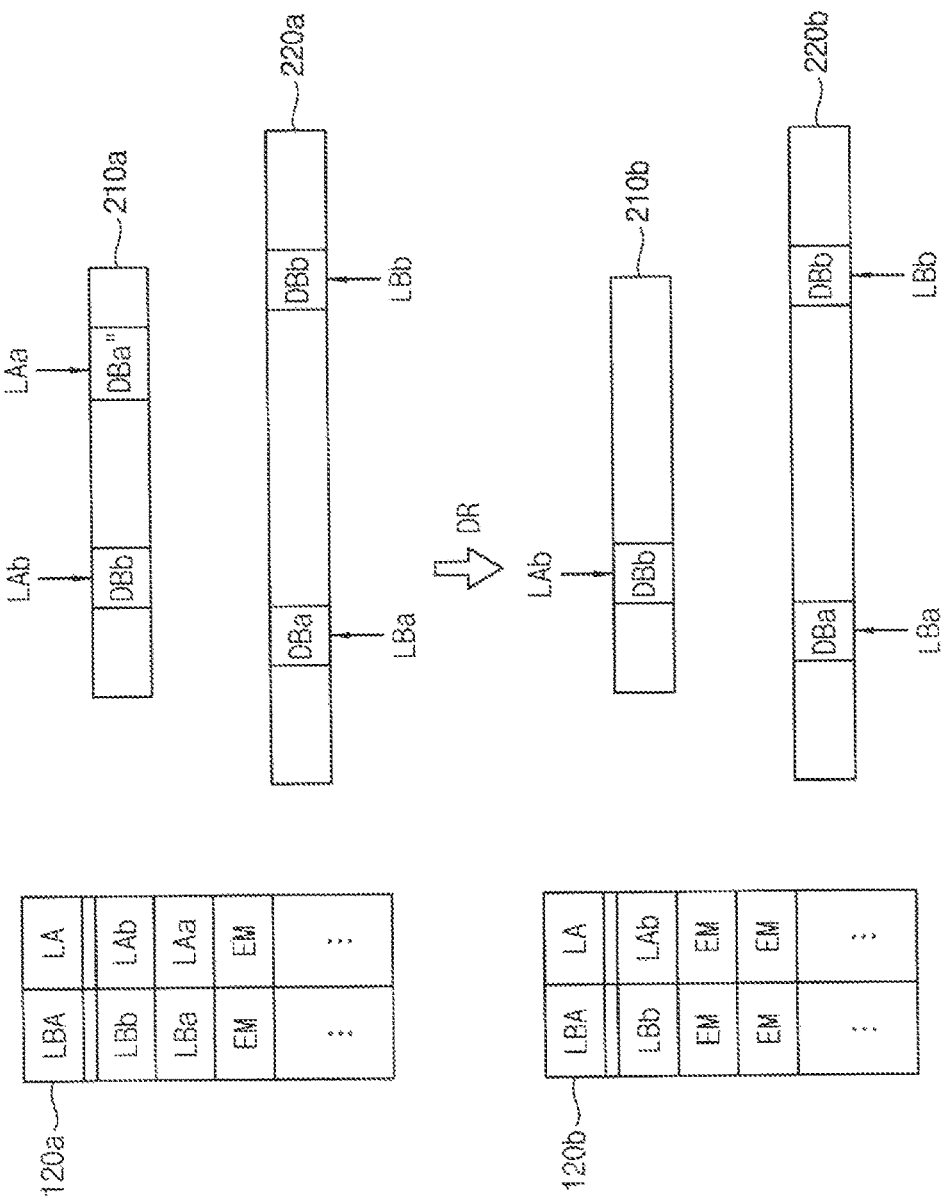
FIG. 33 illustrates a diagram of storage states of the load table and the memory devices according to the drop operation of FIG. 30.

FIG. 30 illustrates a flow chart of a drop operation in an electronic system according to embodiments of the inventive concept. FIG. 31 illustrates a diagram of an example of a drop command for the drop operation of FIG. 30. FIG. 32 illustrates a diagram of signal flow in the drop operation of FIG. 30. FIG. 33 illustrates a diagram of storage states of the load table and the memory devices according to the drop operation of FIG. 30.

Referring to FIGS. 2, 30 through 33, the host device 100 generates a drop command DR including a first logic address LAa of the first memory device 210 (S710). The storage controller 230 of the storage device 200 receives the drop command DR through the block accessible interface 400 (S720). The storage device 200 performs a drop operation based on the drop command DR to delete a data block DBa" stored at the first logic address LAa of the first memory device 210 (S730). The processor 110 of the host device 100 deletes a mapping relation associated with the first logic address LAa from the mapping information MIF in the load table 120 after the drop operation is completed (S740).

As such, the storage device and the electronic system according to embodiments of the inventive concept may efficiently support access between the host device 100 and the storage device 200 by units of a byte and access between the host device 100 and the storage device 200 by units of a block, by performing internal data transfer in the storage device using the internal transfer command ITCMD such as the above-described commands LD, SWR, CB, LBU, LRS, BU and DR, which are modified from the existing block access command STCMD. The access by units of byte may be supported efficiently through the internal data transfer in the storage device, and thus the inter-device data transfer between the host device and the storage device may be reduced and performance of the storage device and the electronic system may be enhanced.

Figure 34:
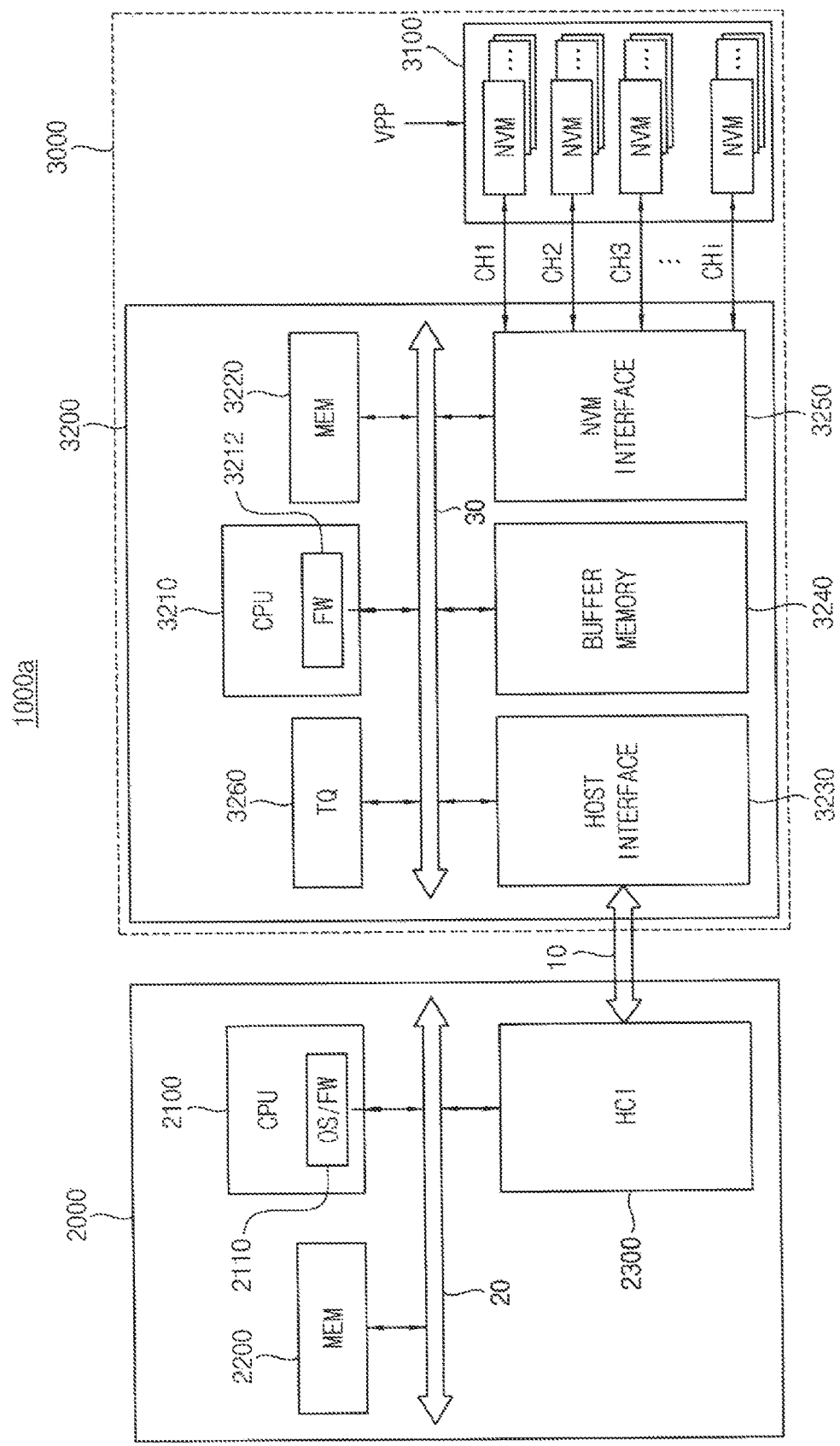
FIG. 34 illustrates a block diagram of a system including a storage device according to embodiments of the inventive concept.

FIG. 34 illustrates a block diagram of a system including a storage device according to embodiments of the inventive concept.

Referring to FIG. 34, a system 1000a includes a host device 2000 and a storage device 3000. For example, the host device 2000 may be an embedded multimedia card (eMMC), a solid state drive (SSD), or the like.

The host device 2000 may be configured to control data processing operations, such as data read operations and data write operations. The system 1000a of FIG. 34 may be an arbitrary electronic system such as for example a personal computer (PC), a laptop computer, a mobile telephone, a smart phone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, an e-book, among other devices.

When the system 1000a is an electronic device, the storage device 3000 may be electrically connected with other components of the system 1000a (electronic device)

through connection means (e.g., pads, pins, buses, or communication lines) to communicate with the host device 2000.

The host device 2000 includes a processor (CPU) 2100, a memory (MEM) 2200 and a host controller interface (HCI) 2300 connected through a bus 20. Operating system (OS) and/or host firmware (FW) 2110 may be executed by the processor 2100. The processor 2100 may include hardware and/or software for controlling generation of a command CMD, analysis of a response RES, storing of data in a register, e.g., an extended (EXT)_CSD register (not shown) of the storage device 3000, and/or data processing. The processor 2100 may execute the operation system and the host firmware 2110 to perform these operations.

The host controller interface 2300 may interface with the storage device 3000. For example, the host controller interface 2300 is configured to issue the command CMD to the storage device 3000, receive the response RES to the command CMD from the storage device 3000, transmit write data to the storage device 3000, and receive read data from the storage device 3000.

The storage device 3000 includes multiple non-volatile memory devices (NVM) 3100 and a storage controller 3200.

The nonvolatile memory devices 3100 may be optionally supplied with an external high voltage VPP. The storage controller 3200 may be connected to the nonvolatile memory devices 3100 through multiple channels CH1 to CHi. The storage controller 3200 includes one or more processors CPU 3210, a memory device MEM 3220, a host interface 3230, a buffer memory 3240, a nonvolatile memory interface 3250 and a task queue TQ 3260 connected through a bus 30.

The buffer memory 3240 may store data used to operate the storage controller 3200. The buffer memory 3240 may be a volatile memory device such as for example dynamic random access memory (DRAM), static random access memory (SRAM), or the like. Although FIG. 34 illustrates an embodiment where the buffer memory 3240 is included in the storage controller 3200, the buffer memory 3240 is not limited thereto. For example, the buffer memory 3240 may be placed outside the storage controller 3200.

The processor 3210 is configured to control overall operations of the storage controller 3200. For example, the processor 3210 may operate firmware 3212 including a flash translation layer (FTL), and may include other firmware. The FTL may perform various functions, e.g., address mapping, read calibration, error correction, among other functions.

The task queue 3260 may store tasks (e.g., write tasks and read tasks provided from the host device 2000) and status information of the respective tasks. Although FIG. 34 shows that the task queue 3260 is outside the host interface 3230, the task queue 3260 may be included in the host interface 3230.

The host interface 3230 may provide an interface with external devices such as the host device 2000. The nonvolatile memory interface 3250 may provide an interface with the nonvolatile memory devices 3100. The host device 2000 and the storage device 3000 may be connected through a bus 10.

The memory device 3220 and/or the buffer memory 3240 may be the above-described first memory device 210 or the byte accessible memory device that is accessed by units of a byte. The nonvolatile memory devices 3100 may be the above-described second memory device 220 or the block accessible memory device that is accessed by units of a block.

Figure 35:
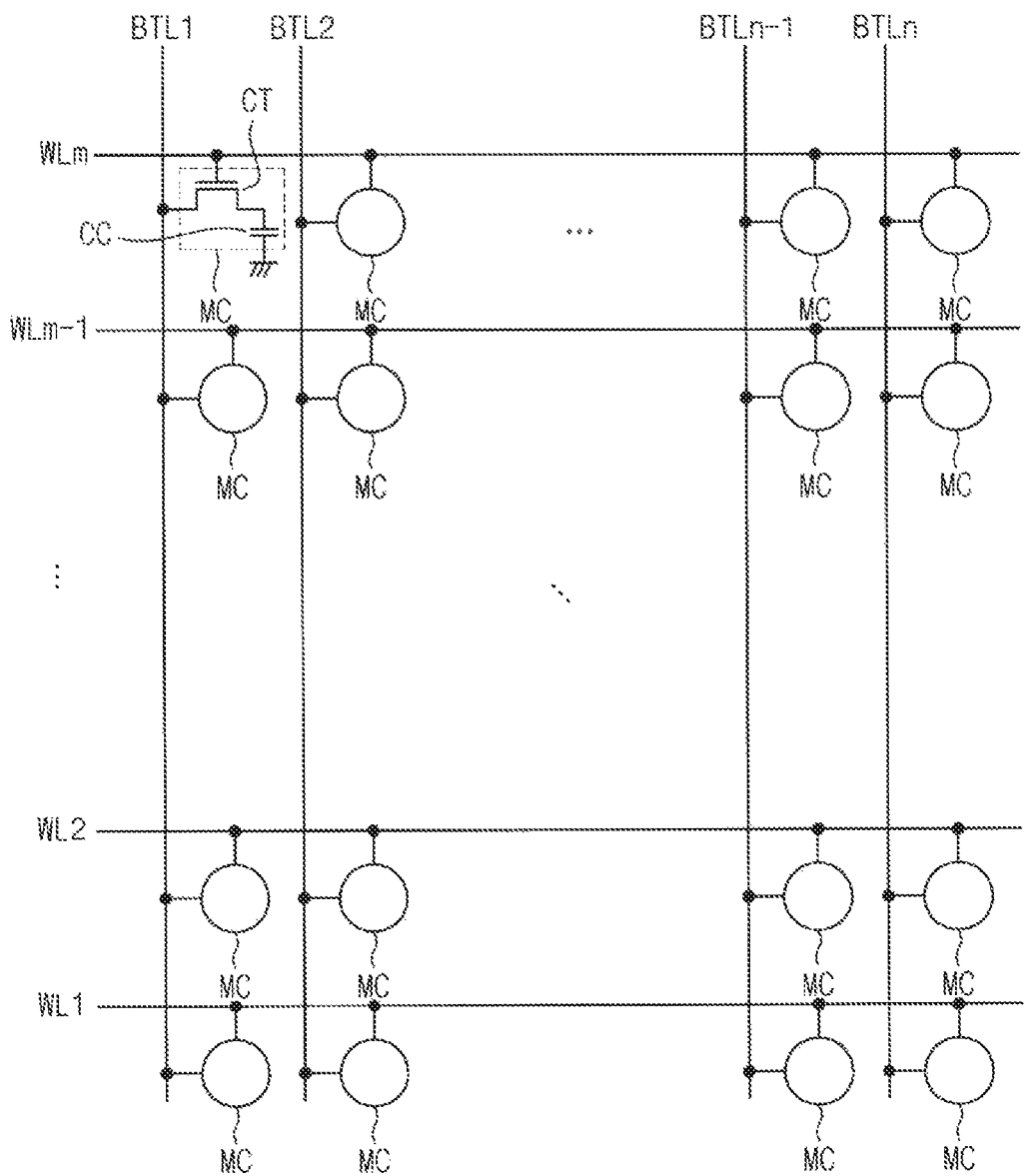
FIG. 35 illustrates a diagram of an example of a memory cell array in a byte accessible memory device included in the storage device in FIG. 34.

FIG. 35 illustrates a diagram of an example of a memory cell array in a byte accessible memory device included in the storage device in FIG. 34.

Referring to FIG. 35, a memory cell array 3221 includes a plurality of word-lines WL1~WLm (m is a natural number greater than two), a plurality of bit-lines BTL1~BTLn (n is a natural number greater than two), and a plurality of memory cells MCs disposed near intersections between the word-lines WL1~WLm and the bit-lines BTL1~BTLn. FIG. 35 illustrates a DRAM cell MC as an example. The DRAM cell MC includes a cell capacitor CC and a transistor CT. The transistor CT is a selection element to connect the cell capacitor CC to the bit-line selectively according to the voltage level of the word-line. The transistor CT is connected between bit-line and the cell capacitor CC and the cell capacitor CC is connected between the transistor CT and a plate voltage electrode (not shown).

FIGS. 36A through 36D respectively illustrate circuit diagrams of examples of a memory cell included in the memory cell array of FIG. 35.

Figure 36A:
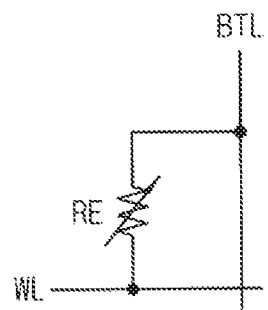
FIG. 36A illustrates a diagram of an example of a memory cell included in the memory cell array of FIG. 35.
Figure 36B:
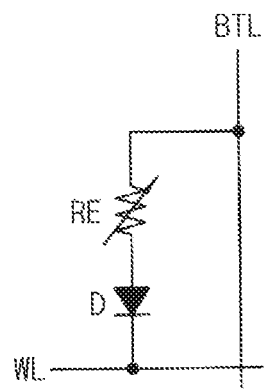
FIG. 36B illustrates a diagram of another example of a memory cell included in the memory cell array of FIG. 35.
Figure 36C:
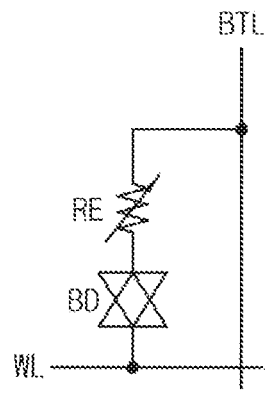
FIG. 36C illustrates a diagram of another example of a memory cell included in the memory cell array of FIG. 35.
Figure 36D:
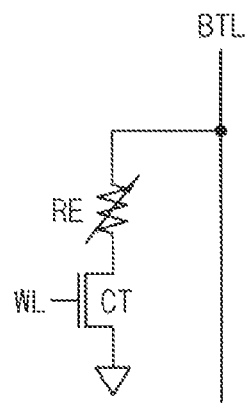
FIG. 36D illustrates a diagram of another example of a memory cell included in the memory cell array of FIG. 35.

FIGS. 36A through 36D illustrate memory cells MC which are implemented with resistive type memory cells. FIG. 36A illustrates a resistive type memory cell without a selection element, while FIGS. 36B to 36D show resistive type memory cells each including a selection element.

Referring to FIG. 36A, a memory cell MC may include a resistive element RE connected to a bit-line BTL and a word-line WL. Such a resistive memory cell having a structure without a selection element may store data by a voltage applied between bit-line BL and word-line WL.

Referring to FIG. 36B, a memory cell MC may include a resistive element RE and a diode D. The resistive element RE may include a resistive material for data storage. The diode D may be a selection element (or switching element) that supplies current to resistive element RE or cuts off the current supply to resistive element RE according to a bias of word-line WL and bit-line BTL. The diode D may be coupled between the resistive element RE and word-line WL, and the resistive element RE may be coupled between the bit-line BTL and the diode D. Positions of the diode D and the resistive element RE may be interchangeable. The diode D may be turned on or turned off by a word-line voltage. Thus, a resistive memory cell may be not driven where a voltage of a constant level or higher is supplied to an unselected word-line WL.

Referring to FIG. 36C, a memory cell MC may include a resistive element RE and a bidirectional diode BD. The resistive element R may include a resistive material for data storage. The bidirectional diode BD may be coupled between the resistive element RE and a word-line WL, and the resistive element RE may be coupled between a bit-line BTL and bidirectional diode BD. Positions of the bidirectional diode BD and the resistive element RE may be interchangeable. The bidirectional diode BD may block leakage current flowing to an unselected semiconductor memory cell.

Referring to FIG. 36D, a memory cell MC may include a resistive element RE and a transistor CT. The transistor CT may be a selection element (or switching element) that supplies current to the resistive element RE or cuts off the current supply to the resistive element RE according to a voltage of a word-line WL. The transistor CT may be coupled between the resistive element RE and a plate voltage electrode (not shown), and the resistive element RE may be coupled between a bit-line BTL and the transistor CT. Positions of the transistor CT and the resistive element RE may be interchangeable. The semiconductor memory cell may be selected or unselected depending on whether the transistor CT driven by word-line WL is turned on or turned off.

Figure 37A:
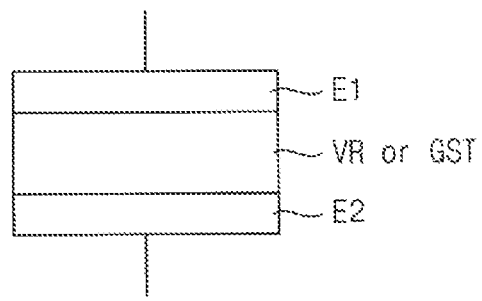
FIG. 37A illustrates a diagram of an example of a resistive element included in a resistive memory cell.
Figure 37B:
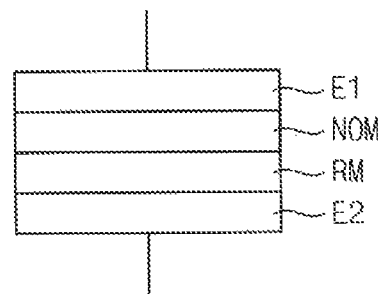
FIG. 37B illustrates a diagram of another example of a resistive element included in a resistive memory cell.

FIGS. 37A and 37B illustrate diagrams of respective examples of a resistive element included in a resistive memory cell.

Referring to FIG. 37A, a resistive element may include a first electrode E1, a second electrode E2 and resistive material between the electrodes E1 and E2. The electrodes E1 and E2 may be formed with metal such as for example tantalum (Ta), platinum (Pt), or other suitable metals. The resistive material may include transition-metal oxide (VR) such as for example cobalt oxide, or phase-change material such as for example GeSbTe (GST), or other materials. The phase-change material may be in amorphous state or in crystalline state depending on heating time and/or heating temperature, and thus the phase-change material may change its resistance according to phase-change.

Phase-change RAM (PRAM) using phase-change materials, resistive RAM (RRAM) using materials having variable resistance, magneto-resistive RAM (MRAM) using ferromagnetic materials and ferroelectric RAM (FRAM) using ferroelectric materials may be differentiated from each other, however such RAM may be collectively be referred to as resistive memories. The resistive memory devices according to example embodiments may include various resistive memories including, for example, PRAM, RRAM, MRAM and FRAM.

The resistive material between the electrodes E1 and E2 has a plurality of stable states having different resistance, and various resistive materials have been researched.

For example, while increasing a voltage applied to material having characteristic of Negative Differential Resistance (NDR), resistance of the NDR material may abruptly increase at a reset voltage (Vreset), the relatively high resistance may be maintained afterwards, and then the NDR material may transition to a state of relatively low resistance at a set voltage (Vset). In this case, the set voltage (Vset) for decreasing the resistance of the NDR material may be greater than the reset voltage (Vreset) for decreasing the resistance of the NDR material.

Chalcogenide using a telluride compound such as GeSbTe may have relatively high resistance when relatively low voltage is applied, and may transition to a state of relatively low resistance if a sufficiently high voltage is applied. In this case, the set voltage (Vset) for decreasing the resistance of the Chalcogenide may be smaller than the reset voltage (Vreset) for decreasing the resistance of the Chalcogenide. As such, an on-state of relatively low resistance and an off-state of relatively high resistance may be programmed or written into memory cells by applying the set voltage (Vset) and the reset voltage (Vreset) corresponding to characteristics of various materials included in the memory cells.

Referring to FIG. 37B, a resistive element may be bipolar type and may include a first electrode E1, a second electrode E2, non-ohmic material (NOM) and resistive material (RM) between the electrodes E1 and E2. In this case, the on-state and the off-state may be programmed or written into memory cells by applying opposite voltages to the electrodes E1 and E2. For example, the on-state and the off-state may be determined according to polarity of the applied voltage.

Figure 38:
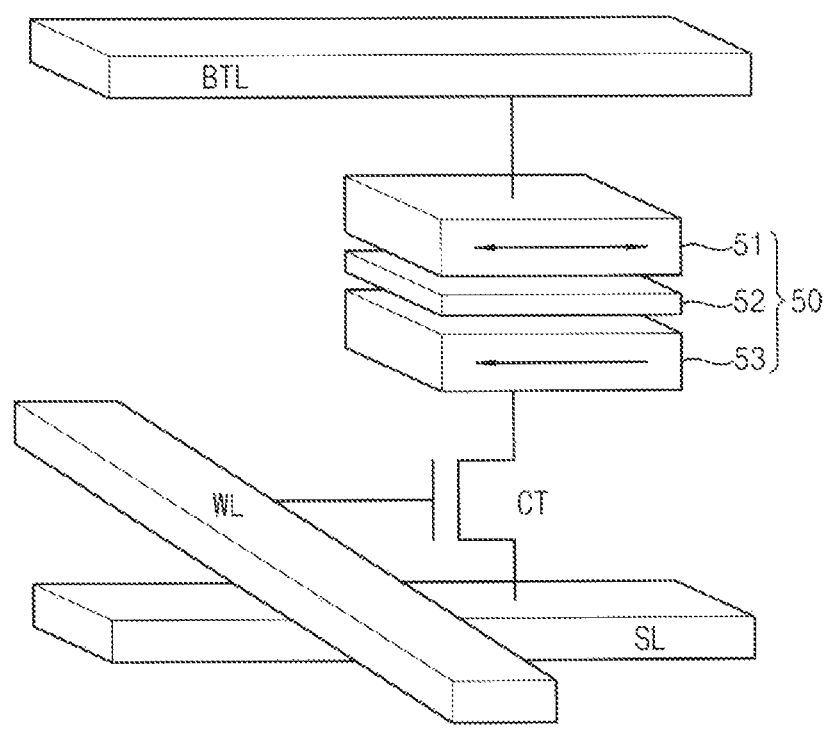
FIG. 38 illustrates a diagram of an example of a spin-transfer torque magneto-resistive random access memory (STT-MRAM) cell included in a resistive memory device.

FIG. 38 illustrates a diagram of an example of a spin-transfer torque magneto-resistive random access memory (STT-MRAM) cell included in a resistive memory device.

Referring to FIG. 38, an STT-MRAM cell includes a Magnetic Tunnel Junction MTJ element 50 and a cell transistor CT. A gate electrode of the cell transistor CT may be connected to a corresponding wordline WL, a first electrode of the cell transistor CT may be connected to a corresponding bitline BTL via the MTJ element 50, and a second electrode of the cell transistor CT may be connected to a source line SL.

The MTJ element 50 includes a pinned layer 53, a free layer 51 and a barrier layer 52 between the two layers 51 and 53. The magnetization direction of the pinned layer 53 may be fixed, however, the magnetization direction of the free layer 51 may be varied, according to the written data, between the same direction as or opposite direction to the magnetization direction of the pinned layer 53. In some embodiments of the inventive concept, an anti-ferromagnetic layer (not illustrated) may be further included in the MTJ element 50 to enforce the magnetization direction of the pinned layer 53.

To perform the data write operation of the STT-MRAM cell, a voltage corresponding to the logic high level may be applied to the wordline WL to turn on the cell transistor CT, and a write current may be applied between the bitline BTL and the source line SL. To perform the data read operation of the STT-MRAM cell, the voltage corresponding to the logic high level may be applied to the wordline WL to turn on the cell transistor CT, a read current may be applied to flow from the bitline BTL to the source line SL, and the resistance may be measured to determine the data stored in the MTJ element 50.

Figure 39A:
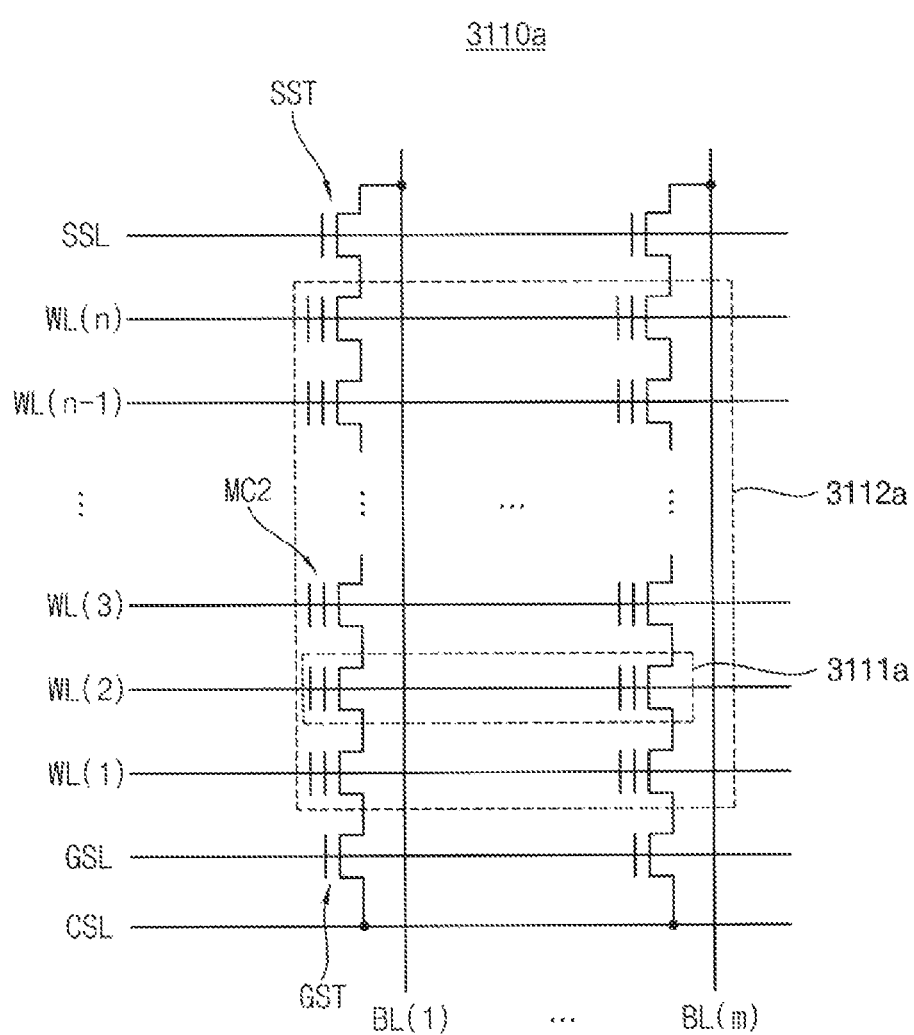
FIG. 39A illustrates a diagram of an example of a memory cell array in a block accessible memory device included in the storage device in FIG. 34.
Figure 39B:
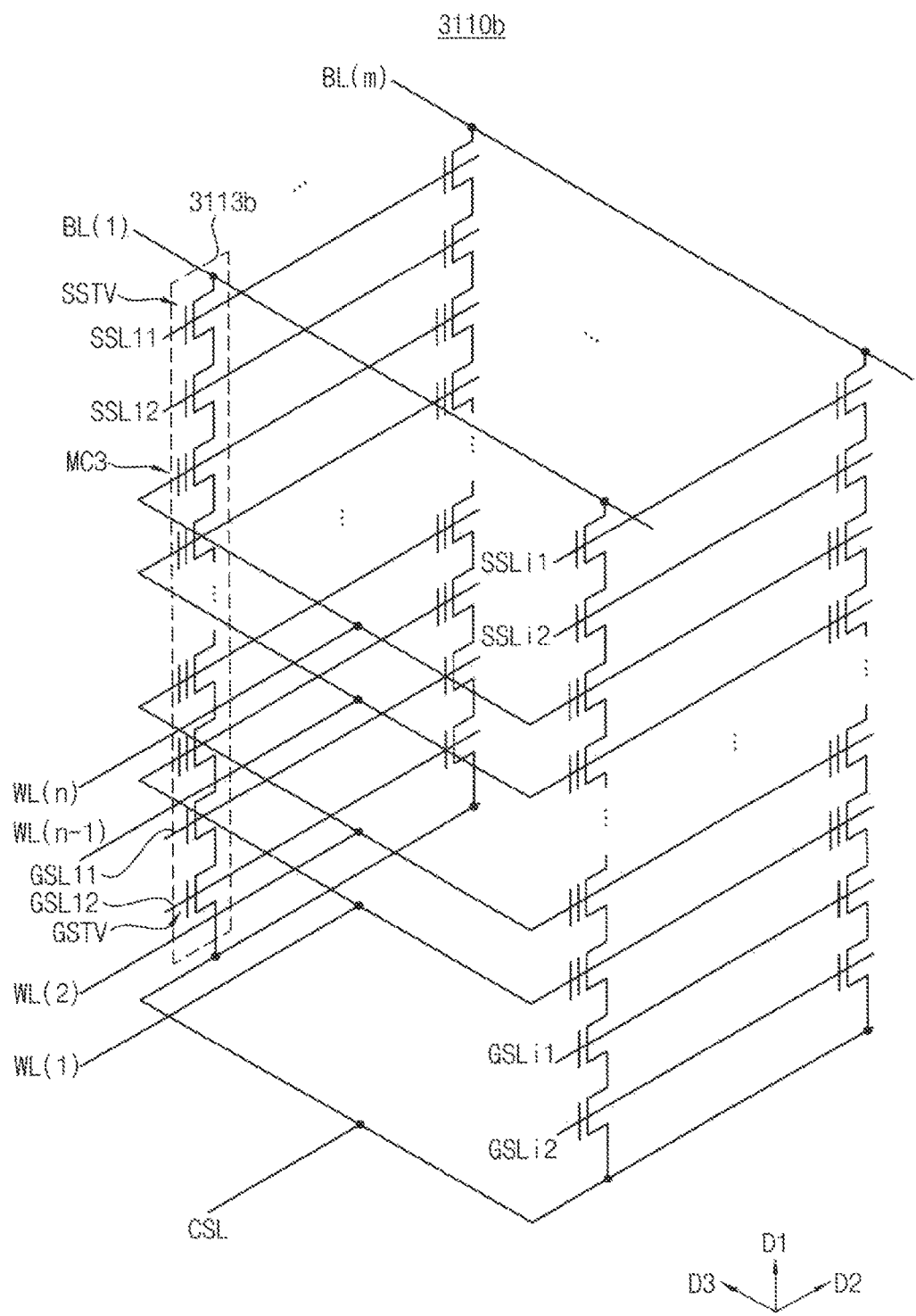
FIG. 39B illustrates a diagram of another example of a memory cell array in a block accessible memory device included in the storage device in FIG. 34.

FIGS. 39A and 39B illustrate diagrams of respective examples of a memory cell array in a block accessible memory device included in the storage device in FIG. 34.

FIG. 39A illustrates a circuit diagram of a memory cell array included in a NAND flash memory device, and FIG. 39B illustrates a circuit diagram of a memory cell array included in a vertical flash memory device.

Referring to FIG. 39A, the memory cell array 3110a includes string select transistors SST, ground select transistors GST and multiple memory cells MC2. The string select transistors SST may be connected to bitlines BL(1), . . . , BL(m), and the ground select transistors GST may be connected to a common source line CSL. The memory cells MC2 may be connected in series between the string select transistors SST and the ground select transistors GST. Memory cells in the same row may be connected to the same wordline among wordlines WL(1), . . . , WL(n). For example, 16, 32 or 64 wordlines may be disposed between a string select line SSL and a ground select line GSL.

The string select transistors SST may be connected to the string select line SSL, and may be controlled by a voltage on the string select line SSL. The ground select transistors GST may be connected to the ground select line GSL, and may be controlled by a voltage on the ground select line GSL. The memory cells MC2 may be controlled by a voltage on the wordlines WL(1), . . . , WL(n).

In the NAND flash memory device including the memory cell array 3110a, a read operation and a program operation may be performed per page 3111a, and an erase operation may be performed per block 3112a. During the program operation, a bulk voltage having a level of about 0 volt may be applied to a bulk substrate of the NAND flash memory device. For example, each page buffer may be connected to an odd-numbered bitline and an even-numbered bitline. In this case, the odd-numbered bitlines may form odd-numbered pages, the even-numbered bitlines may form even-numbered pages, and program operations for the odd-numbered pages and the even-numbered pages may be alternately performed.

Referring to FIG. 39B, a memory cell array 3110b includes multiple strings 3113b each of which has a vertical structure. The strings 3113b may be formed in a second direction to define a string column, and multiple string columns may be formed in a third direction to define a string array. Each string may include string select transistors SSTV, ground select transistors GSTV, and multiple memory cells MC3 that are formed in a first direction D1 and are connected in series between the string select transistors SSTV and the ground select transistors GSTV.

The string select transistors SSTV may be connected to bitlines BL(1), . . . , BL(m), and the ground select transistors GST may be connected to a common source line CSL. The string select transistors SSTV may be connected to string select lines SSL11, SSL12, . . . , SSLi1, SSLi2, and the ground select transistors GSTV may be connected to ground select lines GSL11, GSL12, . . . , GSLi1, GSLi2. The memory cells in the same layer may be connected to the same wordline among wordlines WL(1), WL(2), . . . WL(n−1), WL(n). Each string select line and each ground select line may extend in the second direction D2, and the string select lines SSL11, . . . , SSLi2 and the ground select lines GSL 11, . . . , GSLi2 may be formed in the third direction D3. Each wordline may extend in the second direction D2, and the wordlines WL(1), . . . , WL(n) may be formed in the first direction D1 and the third direction D3. Each bitline may extend in the third direction D3, and the bitlines BL (1), . . . , BL(m) may be formed in the second direction D2. The memory cells MC3 may be controlled by a voltage on the wordlines WL(1), . . . , WL(n).

Similarly to the NAND flash memory device, in the vertical flash memory device including the memory cell array 3110b, a read operation and a program operation may be performed per page, and an erase operation may be performed per block.

Although not illustrated in FIG. 39B, two string select transistors included in a single string may be connected to a single string select line, and two ground select transistors included in the single string may be connected to a single ground select line. According to some embodiments, the single string may include one string select transistor and one ground select transistor.

With reference to FIGS. 35 through 39, the example of the memory cell array and the memory cell for the byte accessible memory device and the block accessible memory device are described but they are not limited thereto.

Figure 40:
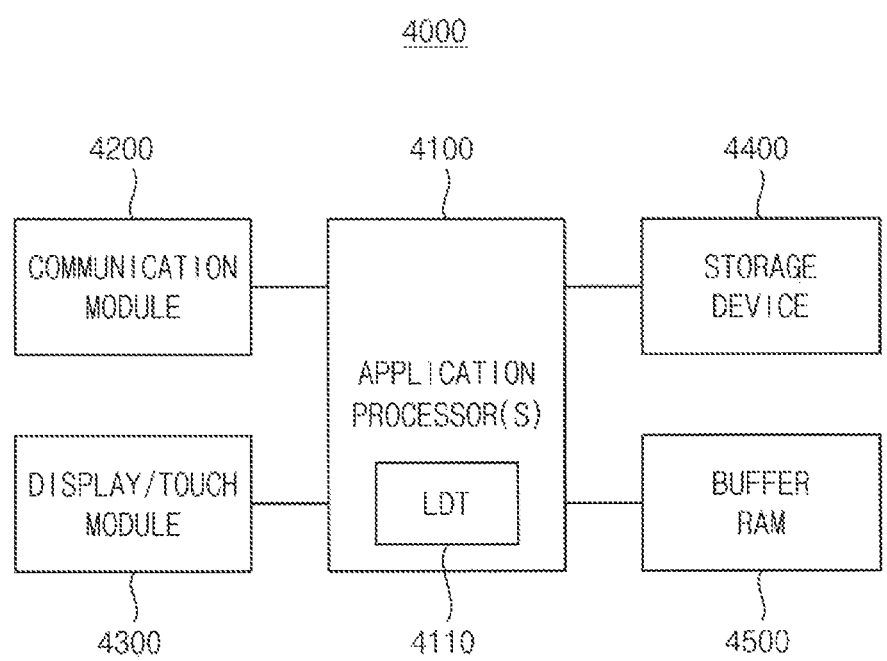
FIG. 40 illustrates a block diagram of a mobile device according to embodiment of the inventive concept.

FIG. 40 illustrates a block diagram of a mobile device according to embodiments of the inventive concept.

Referring to FIG. 40, a mobile device 4000 includes an application processor 4100 (including one or more application processors), a communication module 4200, a display/touch module 4300, a storage device 4400, and a buffer RAM 4500.

The application processor 4100 controls operations of the mobile device 4000. The communication module 4200 is implemented to perform wireless or wire communications with an external device. The display/touch module 4300 is implemented to display data processed by the application processor 4100 and/or to receive data through a touch panel (not shown). The storage device 4400 is implemented to store user data.

The storage device 4400 may be an embedded multimedia card (eMMC), a solid state drive (SSD), a universal flash storage (UFS) device, or the like. The application processor 4100 may include the above-mentioned load table LDT 4110 to store the mapping information. The storage device 4400 may include a first memory device that is accessed by the application processor 4100 by units of a byte through the byte accessible interface and a second memory device that is accessed by the application processor 4100 by units of a block through the block accessible interface. The application processor 4100 may, based on the mapping information, generate a byte access command to access the first memory device, a block access command to access the second memory device and the internal transfer command for the internal data transfer.

The buffer RAM 4500 temporarily stores data used for processing operations of the mobile device 4000. For example, the buffer RAM 4500 may be double data rate (DDR) synchronous DRAM (SDRAM), low power DDR (LPDDR) SDRAM, graphics DDR (GDDR) SDRAM, Rambus DRAM (RDRAM®), or the like.

As described above, the storage device and the electronic system according to embodiments of the inventive concept may efficiently support the access by units of a byte and the access by units of a block between the host device and the storage device by performing internal data transfer in the storage device using the internal transfer command that is modified from the existing block access command. The access by units of a byte may be supported efficiently through the internal data transfer in the storage device, and thus the inter-device data transfer between the host device and the storage device may be reduced and performance of the storage device and the electronic system may be enhanced.

The present inventive concept may be applied to any devices and systems. For example, the present inventive concept may be applied to systems such as a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, or the like.

The foregoing is illustrative of example embodiments and is not to be construed as limiting thereof. Although a few example embodiments have been described, those skilled in the art will readily appreciate that many modifications are possible in the example embodiments without materially departing from the present inventive concept.

What is claimed is:

1. An electronic system comprising:
   a host device; and
   a storage device including a first memory device that is accessed by the host device by units of a byte through a byte accessible interface, and a second memory device that is accessed by the host device by units of a block through a block accessible interface,
   the storage device configured to perform an internal data transfer between the first memory device and the second memory device based on an internal transfer command that is provided through the block accessible interface from the host device,
   wherein the host device comprises
   a load table configured to store mapping information between an address of the first memory device and an address of the second memory device, and
   a processor configured to, based on the mapping information of the load table, generate a byte access command to access the first memory device, a block access command to access the second memory device and the internal transfer command for the internal data transfer.

2. The electronic system of claim 1, wherein the storage device is configured to load data stored at the address of the second memory device to the address of the first memory device, and the host device is configured to thereafter store a mapping relation between the address of the first memory device and the address of the second memory device as the mapping information.

3. The electronic system of claim 2, wherein the storage device comprises:
an internal transfer controller configured to perform the internal data transfer between the first memory device and the second memory device; and
a storage controller configured to receive the block access command and the internal transfer command through the block accessible interface, to perform access to the second memory device by the units of a block based on the block access command, and to control the internal data transfer of the internal transfer controller based on the internal transfer command.

4. The electronic system of claim 3, wherein the storage device further comprises:
a first path selector configured to connect a data path connected to the first memory device selectively to the byte accessible interface or the internal transfer controller; and
a second path selector configured to connect a data path connected to the second memory device selectively to the block accessible interface or the internal transfer controller.

5. The electronic system of claim 2, wherein the processor is configured to selectively access the first memory device by the units of a byte and the second memory device by the units of a block based on the mapping information.

6. The electronic system of claim 2, wherein the host device is configured to generate a load command as the internal transfer command, the load command including a logic address of the first memory device and a logic block address of the second memory device, and
wherein the storage device is configured to receive the load command through the block accessible interface and perform a load operation based on the load command to read out a data block stored at the logic block address of the second memory device and store the data block at the logic address of the first memory device.

7. The electronic system of claim 6, wherein the host device is configured to add a mapping relation between the logic block address and the logic address to the mapping information after the load operation is completed.

8. The electronic system of claim 2, wherein the host device is configured to generate a synchronized write command as the internal transfer command, the synchronized write command including a logic address of the first memory device and a logic block address of the second memory device, and
wherein the storage device is configured to receive the synchronized write command through the block accessible interface, and perform a synchronized write operation based on the synchronized write command to store an updated data block provided from the host device at the logic address of the first memory device and store the updated data block at the logic block address of the second memory device.

9. The electronic system of claim 2, wherein the host device is configured to generate a copy-back command as the internal transfer command, the copy-back command including a logic address of the first memory device and a logic block address of the second memory device, and
wherein the storage device is configured to receive the copy-back command through the block accessible interface, and perform a copy-back operation based on the copy-back command to read out a data block stored at the logic address of the first memory device and store the data block at the logic block address of the second memory device.

10. The electronic system of claim 2, wherein, when the electronic system is powered off, the storage device is configured to perform a loading information backup operation to read out a data block that is loaded to the first memory device from the second memory device, and store loading information including the mapping information and the data block in a meta data region of the second memory device.

11. The electronic system of claim 10, wherein the host device is configured to generate a loading information backup command as the internal transfer command, the loading information backup command including the mapping information when the electronic system is powered off, and
wherein the storage device is configured to receive the loading information backup command through the block accessible interface, and perform the loading information backup operation based on the loading information backup command.

12. The electronic system of claim 10, wherein the storage device is configured to read out the loading information stored in the meta data region of the second memory device when the electronic system is powered on, and perform a power-on load operation based on the mapping information included in the loading information to load the data block included in the loading information to the first memory device.

13. The electronic system of claim 12, wherein the host device is configured to generate a loading information restore command as the internal transfer command when the electronic system is powered on, and
wherein the storage device is configured to receive the loading information restore command through the block accessible interface, and transfer the mapping information to the host device based on the loading information restore command.

14. The electronic system of claim 2, wherein the host device is configured to generate a backup command as the internal transfer command, the backup command including a logic address of the first memory device and a logic block address of the second memory device, and
wherein the storage device is configured to receive the backup command through the block accessible interface, and perform a backup operation based on the backup command to read out a corrected data block stored at the logic address of the first memory device and store the corrected data block at the logic block address of the second memory device.

15. The electronic system of claim 2, wherein the host device is configured to generate a drop command as the internal transfer command, the drop command including a logic address of the first memory device, and
wherein the storage device is configured to receive the drop command through the block accessible interface, and perform a drop operation based on the drop command to delete a data block stored at the logic address of the first memory device.

16. A storage device comprising:
a first memory device configured to be accessed by a host device through a byte accessible interface;
a second memory device configured to be accessed by the host device through a block accessible interface;

an internal transfer controller configured to perform an internal data transfer between the first memory device and the second memory device;

a storage controller configured to receive a block access command and an internal transfer command through the block accessible interface, to perform an access to the second memory device by units of a block based on the block access command, and to control the internal data transfer performed by the internal transfer controller based on the internal transfer command a first path selector configured to selectively connect the first memory device to the byte accessible interface and the internal transfer controller based on the internal transfer command; and a second path selector configured to selectively connect the second memory device to the block accessible interface and the internal transfer controller based on the internal transfer command.

17. A method of operating an electronic system including a host device and a storage device, the method comprising:

accessing, by the host device, a first memory device included in the storage device by units of a byte through a byte accessible interface;

accessing, by the host device, a second memory device included in the storage device by units of a block through a block accessible interface;

performing, by the storage device, an internal data transfer between the first memory device and the second memory device based on an internal transfer command provided from the host device to the storage device through the block accessible interface;

generating, by the host device, a synchronized write command as the internal transfer command, the synchronized write command including a logic address of the first memory device and a logic block address of the second memory device; and performing, by the storage device, the internal data transfer as a synchronized write operation based on the synchronized write command to store an updated data block provided from the host device at the logic address of the first memory device and store the updated data block at the logic block address of the second memory device.

18. The method of claim 17, further comprising:

determining, by the host device, whether a data block is loaded to the first memory device based on mapping information; and selectively performing, by the host device, access to the first memory device by units of a byte through the byte accessible interface and access to the second memory device by units of a block through the block accessible interface based on said determining.

* * * * *